US011124238B2

(12) United States Patent
Lian et al.

(10) Patent No.: US 11,124,238 B2
(45) Date of Patent: Sep. 21, 2021

(54) VEHICLE BODY STRUCTURE AND VEHICLE

(71) Applicant: BYD COMPANY LIMITED, Guangdong (CN)

(72) Inventors: Yubo Lian, Shenzhen (CN); Ming Ji, Shenzhen (CN); Xinchun Liu, Shenzhen (CN); Rongrong Zhang, Shenzhen (CN); Maoyan Liang, Shenzhen (CN)

(73) Assignee: BYD COMPANY LIMITED, Guangdong (CN)

( * ) Notice: Subject to any disclaimer, the term of this patent is extended or adjusted under 35 U.S.C. 154(b) by 21 days.

(21) Appl. No.: 16/627,640

(22) PCT Filed: Jun. 28, 2018

(86) PCT No.: PCT/CN2018/093447
§ 371 (c)(1),
(2) Date: Dec. 30, 2019

(87) PCT Pub. No.: WO2019/001536
PCT Pub. Date: Jan. 3, 2019

(65) Prior Publication Data
US 2021/0147001 A1 May 20, 2021

(30) Foreign Application Priority Data
Jun. 30, 2017 (CN) .......................... 201710527398.8

(51) Int. Cl.
*B60J 7/00* (2006.01)
*B62D 21/15* (2006.01)
(Continued)

(52) U.S. Cl.
CPC .............. *B62D 21/152* (2013.01); *B60K 1/04* (2013.01); *B62D 25/145* (2013.01); *B62D 25/2036* (2013.01); *B60K 2001/0438* (2013.01)

(58) Field of Classification Search
CPC ...... B62D 21/02; B62D 25/04; B62D 25/082; B62D 21/20; A01D 67/00; B60R 19/18; B60R 19/34; Y02E 10/72; A63B 22/02
See application file for complete search history.

(56) References Cited

U.S. PATENT DOCUMENTS 5,005,898 A * 4/1991 Benedetto ............. B60R 13/083
296/191
5,615,749 A * 4/1997 Kato ....................... B60R 21/09
180/274
(Continued)

FOREIGN PATENT DOCUMENTS

| CN | 1449960 A | 10/2003 |
| CN | 1903634 A | 1/2007 |

(Continued)

OTHER PUBLICATIONS

English Translation of International Search Report from PCT/CN2018/093447 dated Sep. 25, 2018 (2 pages).

*Primary Examiner* — Kiran B Patel
(74) *Attorney, Agent, or Firm* — Calfee, Halter & Griswold LLP

(57) ABSTRACT

A vehicle body structure and a vehicle are provided. The vehicle body structure includes a front longitudinal beam, a front compartment crossbeam, and a dash panel. The front longitudinal beam includes a left front longitudinal beam and a right front longitudinal beam that are disposed at an interval in a transverse direction. The front compartment crossbeam is mounted on the left front longitudinal beam and the right front longitudinal beam, and is located in front of the dash panel. A projection area of the front compartment (Continued)

crossbeam on the dash panel in an X direction at least partially covers a projection of a preset area surrounding a pedal center point on the dash panel in the X direction.

17 Claims, 22 Drawing Sheets

(51) Int. Cl.
    *B62D 25/20*     (2006.01)
    *B60K 1/04*     (2019.01)
    *B62D 25/14*     (2006.01)

(56) References Cited

U.S. PATENT DOCUMENTS

| | | | |
|---|---|---|---|
| 6,408,711 B1 * | 6/2002 | Mizuma | B60R 21/09 74/512 |
| 2012/0001456 A1 * | 1/2012 | Naoi | B62D 25/2045 296/193.09 |
| 2012/0043785 A1 * | 2/2012 | Mildner | B62D 25/082 296/193.02 |
| 2012/0181803 A1 * | 7/2012 | Snell | B62D 21/155 293/133 |
| 2013/0093215 A1 * | 4/2013 | Naoi | B62D 25/08 296/203.02 |
| 2013/0099527 A1 * | 4/2013 | Naoi | B62D 25/08 296/203.02 |
| 2015/0175216 A1 * | 6/2015 | Hisazumi | B62D 25/082 296/192 |
| 2016/0052561 A1 * | 2/2016 | Atsumi | B62D 25/2018 296/187.08 |
| 2018/0015953 A1 * | 1/2018 | Ajisaka | B62D 25/14 |
| 2021/0061368 A1 * | 3/2021 | Satoh | B62D 25/14 |

FOREIGN PATENT DOCUMENTS

| | | |
|---|---|---|
| CN | 201712671 U | 1/2011 |
| CN | 201800772 U | 4/2011 |
| CN | 102730085 A | 10/2012 |
| CN | 102883942 | 1/2013 |
| CN | 202641858 U | 1/2013 |
| CN | 103231738 A | 8/2013 |
| CN | 203255261 U | 10/2013 |
| CN | 203402249 U | 1/2014 |
| CN | 103738404 A | 4/2014 |
| CN | 103770841 A | 5/2014 |
| CN | 104417617 A | 3/2015 |
| CN | 104648483 A | 5/2015 |
| CN | 204527307 U | 8/2015 |
| CN | 204587034 U | 8/2015 |
| CN | 106882272 A | 6/2017 |
| DE | 102012023946 A1 | 6/2014 |
| JP | H119185 A | 1/1999 |

* cited by examiner

VEHICLE BODY STRUCTURE AND VEHICLE

CROSS-REFERENCE TO RELATED APPLICATIONS

This application is based on International Application No. PCT/CN2018/093447, filed on Jun. 28, 2018, which claims priority to and benefits of Chinese Patent Application Serial Nos. 201710527398.8, filed with the State Intellectual Property Office of P. R. China on Jun. 30, 2017. The entire contents of the above-referenced applications are incorporated herein by reference.

FIELD

The present disclosure relates to the technical field of vehicle body structures of vehicles, and specifically, to a vehicle body structure and a vehicle having the vehicle body structure.

BACKGROUND

To minimize the mortality and injury severity of occupants in a traffic (collision) accident of a vehicle, especially, a passenger car, is a core design technology of developing and manufacturing the entire passenger car. Design of a collision safety deformation structure of a vehicle body structure is the foundation for improving collision safety performance of an entire vehicle. In recent years, to satisfy people's requirements of increasingly high collision safety of household passenger cars, related departments of different countries keep improving and adding some test conditions for the collision safety performance of passenger cars in related regulations and evaluation specifications in their countries. For example, in the Units States, for vehicles sold in the domestic market of the United States, a series of regulations and evaluation specifications related to the safety collision performance are updated, and it is required that an occupant compartment withstand a larger collision force and have relatively small deformation under more working conditions.

With the popularization of household vehicles in the global market, environmental protection problems caused by a shortage and combustion of fossil energy become increasingly severe. Therefore, many countries are actively developing alternative fuel vehicles. As a new direction of alternative fuel vehicles, electric vehicles are becoming a future trend. In the design of an electric vehicle, conventional designs need to be followed, and a relatively large range further needs to be designed to keep the electric vehicle competitive with a conventional fuel vehicle.

An electric vehicle needs to be equipped with more storage batteries to increase a range. In this case, the overall weight of an electric vehicle is greatly increased as compared with a fuel vehicle having the same specifications. Therefore, under the same test conditions, the power of the entire vehicle is increased in an initial stage of a collision. To be specific, the vehicle body structure of the electric vehicle needs to withstand a larger force and absorb more motion energy to improve safety. Further, in an electric vehicle, storage battery packs that need to be arranged occupy a large space in the lower portion of the vehicle body. As a result, various classical technologies for vehicle body collision safety structures of conventional fuel vehicles cannot be used. Therefore, it is imperative to design a new technology of a vehicle structure that can satisfy requirements of both storage battery arrangement and vehicle safety.

SUMMARY

An objective of the present disclosure is to provide a vehicle body structure and a vehicle using the vehicle body structure.

To achieve the objective, the present disclosure provides a vehicle body structure, including a front longitudinal beam, a front compartment crossbeam, and a dash panel. The front longitudinal beam includes a left front longitudinal beam and a right front longitudinal beam that are disposed at an interval in a transverse direction. The front compartment crossbeam is mounted on the left front longitudinal beam and the right front longitudinal beam, and is located in front of the dash panel. A projection area of the front compartment crossbeam on the dash panel in an X direction at least partially covers a projection of a preset area surrounding a pedal center point on the dash panel in the X direction.

The present disclosure further provides a vehicle. The vehicle includes the vehicle body structure provided by the present disclosure.

By means of the foregoing technical solution, the strength and stability of the vehicle body structure can be effectively improved in the case of a front collision, so that the vehicle has higher safety performance.

Other features and advantages of the present disclosure are described in detail in the subsequent specific implementations.

BRIEF DESCRIPTION OF THE DRAWINGS

The accompanying drawings are used to provide a further understanding of the present disclosure, and they constitute a part of the specification. The drawings, along with the following specific implementations, are used to explain the present disclosure, and do not constitute any limitation to the present disclosure. In the drawings.

DETAILED DESCRIPTION

Figure 1:
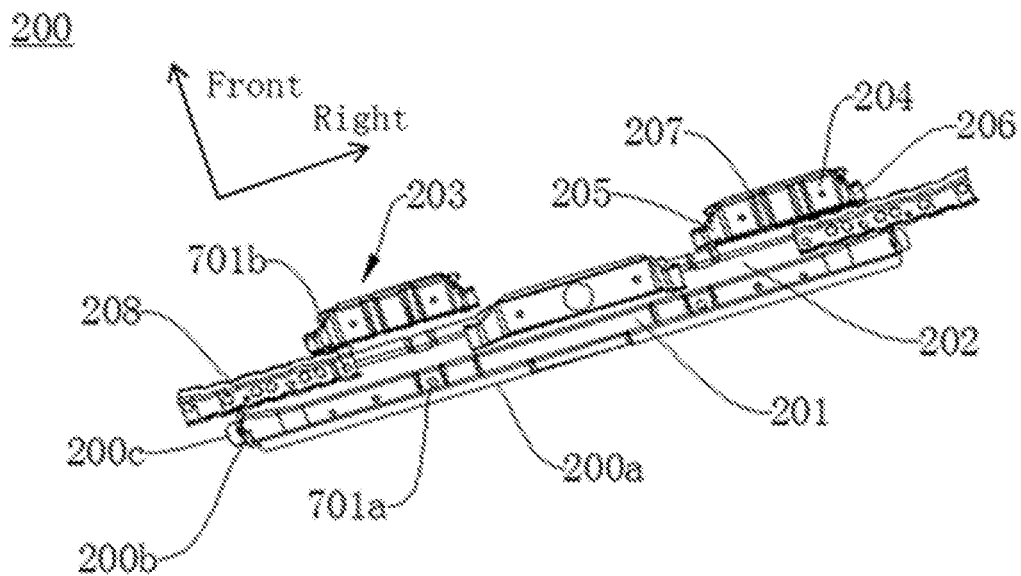
FIG. 1 is an exploded view of a specific implementation of a vehicle body crossbeam used in the present disclosure.

The following describes specific implementations of the present disclosure in detail with reference to the accompanying drawings. It should be understood that the specific implementations described herein are merely used to describe and explain the present disclosure, but are not intended to limit the present disclosure.

In the present disclosure, unless otherwise specified, the used positional terms such as "up, down, left, right, front, and rear" are defined based on a vertical direction, a transverse direction, and a longitudinal direction of a vehicle. Specifically, in the accompanying drawings, the X direction is the longitudinal direction of the vehicle, where a side to which an arrow points is "front", and the opposite side is "rear"; the Y direction is the transverse direction, where a side to which an arrow points is "right", and the opposite side is "left"; and the Z direction is the vertical direction, where a side to which an arrow points is "up", and the opposite side is "down". "Inner and outer" are defined based on contours of corresponding components. For example, a contour of a vehicle is used to define "inner and outer" for the vehicle, where a side near the middle portion of the vehicle is "inner", and the opposite side is "outer". The foregoing definitions are merely used for helping to describe the present disclosure, and should not be understood as a limitation.

In addition, all "crossbeams" in the present disclosure are beams extending in a transverse direction of a vehicle, and all "longitudinal beams" are beams extending in a longitudinal direction of the vehicle. A "front longitudinal beam" is a longitudinal beam extending backward from a front anti-collision crossbeam of the vehicle in a vehicle body structure. A "rear longitudinal beam" is a longitudinal beam extending forward from a rear anti-collision crossbeam of the vehicle in the vehicle body structure. There are usually two longitudinal beams, and the longitudinal beams are symmetrically provided with respect to a longitudinal centerline of the vehicle. For example, the "front longitudinal beam" usually includes a "left front longitudinal beam" and a "right front longitudinal beam" that are disposed at an interval in a transverse direction. In addition, a "front collision" in the present disclosure is a case in which the front of the vehicle is impacted, and a "side collision" is a case in which a side of the vehicle is impacted. In addition, when there are no other special explanations, the meanings of nouns such as a "dash panel", a "floor panel", and a "sill inner plate" are meanings commonly known in the field.

In addition, when there is no special description or limitation, the terms such as "connection", "mount", "connected", and "fixed" can be explained in a general sense. They may be implemented in manners that are known to a person skilled in the art. The manners are, for example, a nondetachable manner such as a welding manner, a detachable manner such as a bolt manner, or an integral forming manner such as molding.

The present disclosure provides descriptions of some implementations in detail below with reference to corresponding accompanying drawings. For convenience of description, the present disclosure first introduces some parts in the present disclosure, for example, the following vehicle body crossbeam.

Figure 2:
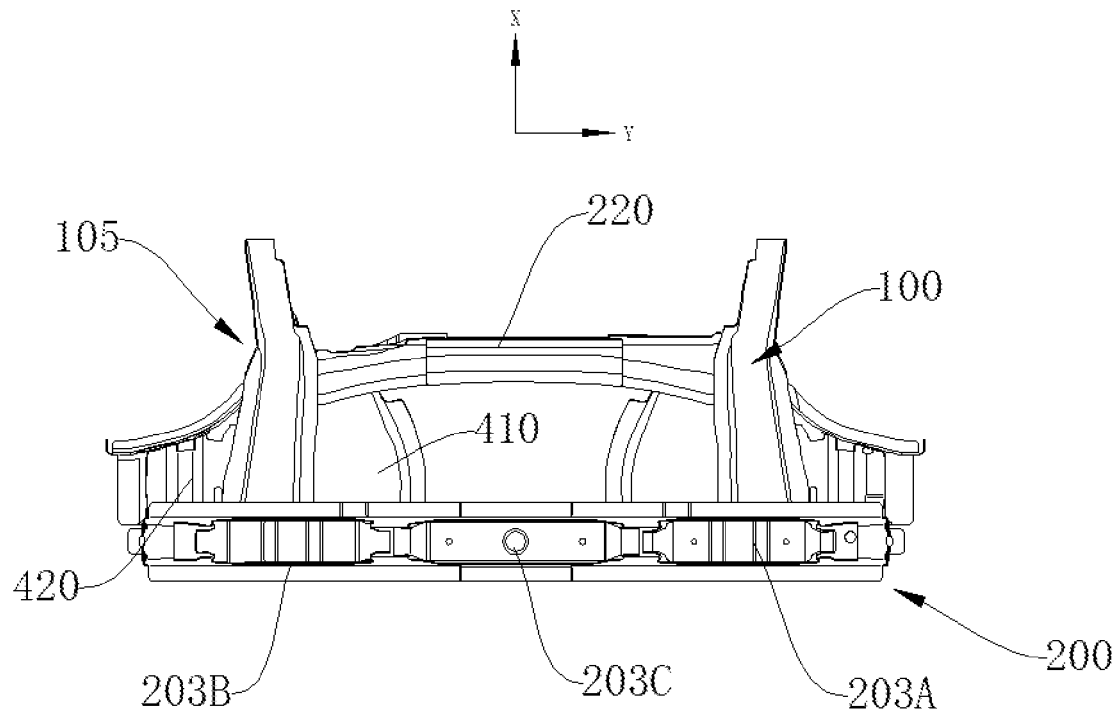
FIG. 2 is a top view of the vehicle body crossbeam provided in FIG. 1 being applied to a vehicle body structure.
Figure 3:
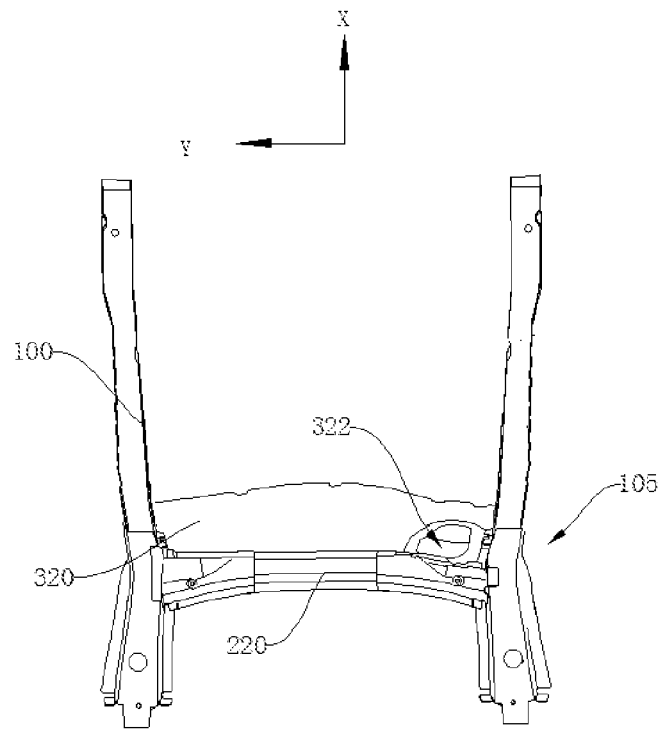
FIG. 3 is a partial schematic structural diagram of a vehicle body structure according to the present disclosure, where a front longitudinal beam, a front compartment crossbeam, and a dash panel are shown.
Figure 4:
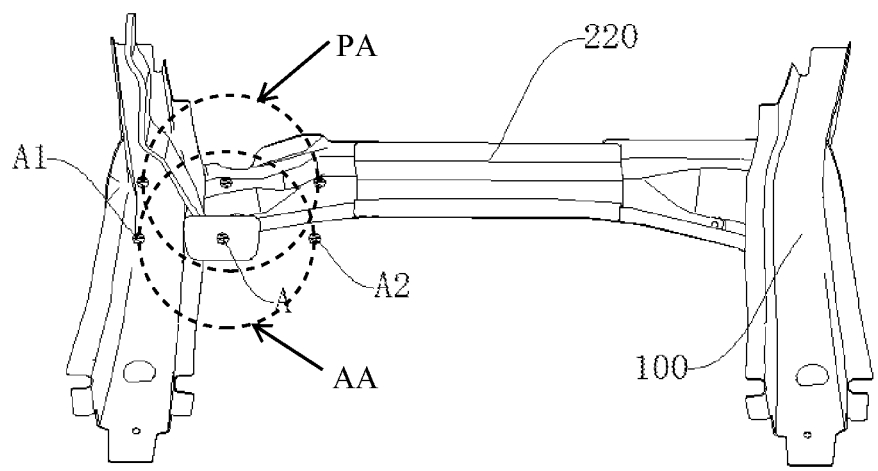
FIG. 4 is schematic diagram of a preset area surrounding a pedal center point in a vehicle body according to the present disclosure.

According to a first aspect of the present disclosure, a vehicle body crossbeam 200 is provided. FIG. 1 and FIG. 2 show a specific implementation of the vehicle body crossbeam 200 according the first aspect of the present disclosure. The vehicle body crossbeam 200 may include a groove crossbeam body and a supporting member. The supporting member is connected to the groove crossbeam body, and the supporting member and at least a part of the groove crossbeam body form a supporting structure having a closed cross-section. The supporting structure can improve the strength of the vehicle body crossbeam 200, thereby effectively withstanding a force, for example, collision impact, in a longitudinal direction.

When the vehicle body crossbeam 200 provided in the first aspect of the present disclosure is applied to a vehicle body structure, the vehicle body crossbeam 200 may be used as a carrying structure for other elements of a vehicle, for example, as a battery pack mounting crossbeam (for example, a battery pack front mounting crossbeam). When the vehicle is involved in a front collision, that is, when the vehicle is impacted in a longitudinal direction, the vehicle body crossbeam 200 is used to absorb impact energy. The supporting structure having the closed cross-section provides the vehicle body crossbeam 200 with higher overall strength and better stability, to ensure that the vehicle body crossbeam 200 does not easily deform when being impacted, thereby preventing a fire that may occur because a battery pack behind the battery pack front mounting crossbeam is impacted or pressed and deformed, to protect other components of the vehicle and occupants in the vehicle.

Specifically, the groove crossbeam body may include a crossbeam bottom wall 201 and crossbeam side walls 202 located on two sides of the crossbeam bottom wall 201. The supporting member is formed as a supporting plate 203 connected between the two crossbeam side walls 202, so that the groove crossbeam body and the supporting plate 203 form the supporting structure having a rectangular cross-section, to improve the strength of the vehicle body crossbeam 200. In addition, the groove crossbeam body has a regular external contour that helps to improve applicability of the vehicle body crossbeam 200, making it convenient to mount the vehicle body crossbeam 200 and other components in the vehicle body structure, for example, to join components such as a front longitudinal beam 100, a floor longitudinal beam 110, and a sill inner plate 500 of the vehicle body structure that are described below.

Further, to ensure the stability of the supporting structure, the supporting plate 203 folds upward along a lateral edge extending in a transverse direction to form a supporting-plate flange, so that the supporting plate 203 can be welded to the two crossbeam side walls 202 by using the supporting-plate flange. In actual manufacturing, a reinforcing structure may further be disposed in a cavity defined by the groove crossbeam body and the supporting plate 203. For example, a sheet metal is welded or a car body sheet (CBS) material (a composite reinforcement material) is filled, to further improve a capability of withstanding a collision of the vehicle body crossbeam 200 and reduce a deformation amount of the vehicle body crossbeam 200 in the collision.

The supporting plate 203 may be formed into any appropriate structure, for example, formed into a corrugated plate extending in a length direction of the groove crossbeam body. In another possible implementation, as shown in FIG. 1, the supporting plate 203 may include a flat plate 204 parallel to the crossbeam bottom wall 201 and an inclined plate 205 extending from the left side and the right side of the flat plate 204 obliquely downward to the crossbeam bottom wall 201, to support the groove crossbeam body more effectively during a collision. Therefore, a collision force can be transferred from one crossbeam side wall 202 to the other crossbeam side wall 202 through the flat plate 204 and the inclined plate 205, thereby helping to distribute collision energy. Instead of transferring collision energy from one crossbeam side wall 202 to the other crossbeam side wall 202 through only the flat plate 204, the crossbeam side wall 202 on one side is further prevented from being bent or damaged by excessively large impact, thereby protecting other components of the vehicle or occupants in the vehicle from damage.

Specifically, the supporting plate 203 may be a π-shaped structure in a transverse direction. The π-shaped structure includes the flat plate 204, the inclined plate 205, and an end plate 206 extending from the inclined plate 205 along the crossbeam bottom wall 201. The end plate 206 is attached and fastened to the crossbeam bottom wall 201, and a specific fastening manner may be welding. That is, the supporting plate 203 has a connection relationship with both the crossbeam bottom wall 201 and the crossbeam side walls 202 on two sides, thereby ensuring the stability of the supporting structure of the rectangular cross-section and preventing the supporting plate 203 from being detached from the groove crossbeam body due to the collision.

To further improve the strength of the vehicle body crossbeam 200, a supporting-plate reinforcing rib 207 extending in a longitudinal direction is disposed on the supporting plate 203 to bear a force of the front collision, thereby preventing the supporting plate 203 from bending and pushing apart the crossbeam side walls 202 on two sides and implementing transfer of the force between the crossbeam side walls 202 on the two sides. The quantity of the supporting-plate reinforcing ribs 207 and an arrangement manner of the supporting-plate reinforcing ribs 207 may be randomly selected according to an actual requirement. This is not specifically limited in the present disclosure. The supporting-plate reinforcing rib 207 may be integrally formed with the supporting plate 203, or may be connected to the supporting plate 203 in a manner such as welding.

In this implementation, there may be a plurality of supporting members, and the supporting members are disposed along the groove crossbeam body in sequence. Therefore, it can be less difficult to manufacture and mount the supporting member, and it can be ensured that the strength of the vehicle body crossbeam 200 is uniformly distributed in a length direction of the vehicle body crossbeam 200, thereby integrally improving the capability of withstanding a collision of the vehicle body crossbeam 200. In another possible implementation, the size of the supporting member may be approximately the same as the size of the crossbeam body in a length direction. That is, one supporting member is used to support the crossbeam side walls 202 of the groove crossbeam body, or a plurality of supporting members are disposed in the length direction of the groove crossbeam body at an interval according to force-receiving positions of a collision of the vehicle body crossbeam 200.

The vehicle body crossbeam 200 provided in the present disclosure can be applied to a crossbeam in any position in the vehicle body structure, for example, a crossbeam joined to an end portion of a longitudinal beam. That is, the longitudinal beam stops at the vehicle body crossbeam 200. In some implementations of the present disclosure, the vehicle body crossbeam 200 may be a front crossbeam 210. In some implementations of the present disclosure, the front crossbeam 210 may be a vehicle body crossbeam fastened on a lower surface of a floor panel 300, a vehicle body crossbeam mounted near a dash panel 320, a vehicle body crossbeam mounted near a front end of the sill inner plate 500, a vehicle body crossbeam disposed in front of a mounting crossbeam of a front seat, or may be a vehicle body crossbeam mounted near a lower end of an inner plate of an A pillar. The front crossbeam 210 may be positioned below an occupant compartment of the vehicle. A distance between the front crossbeam and the front end of the sill inner plate 500 may be from 30 mm to 1000 mm. When the front crossbeam 210 is mounted near the front end of the sill inner plate 500, the distance between the front crossbeam 210 and the front end of the sill inner plate 500 is from 30 mm to 140 mm. In addition, according to different vehicle models, in some implementations, the front crossbeam may be alternatively at a position of a connection plate between front and middle floors that is well known in the art. The distance between the front crossbeam and the front end of the sill inner plate 500 is approximately 1000 mm. In addition, in various possible implementations, the distance between the front crossbeam 210 and the front end of the sill inner plate 500 may be alternatively 60/80/120/200/300/450/600/700/850/950 mm or the like.

In some implementations, the front crossbeam 210 is joined to a rear end of the front longitudinal beam 100. In other words, the front crossbeam 210 is joined to a rear end portion of the front longitudinal beam 100. That is, the front longitudinal beam 100 stops at the front crossbeam 210. The front crossbeam 210 may further be used as a battery pack front mounting crossbeam for mounting a battery pack. Specifically, a battery tray fastening hole 701 may be provided in the vehicle body crossbeam 200, to mount a battery tray carrying a battery pack on the battery pack front mounting crossbeam by using a fastening element. It should be noted that the front crossbeam 210 may satisfy one or more of the foregoing constraint conditions. For example, the front crossbeam 210 is mounted on the lower surface of the floor panel and near the dash panel.

In addition, a connection plate may be disposed between the longitudinal beam and the vehicle body crossbeam 200, to improve the connection stability of the longitudinal beam and the vehicle body crossbeam 200, and help distribute a force from the longitudinal beam to the vehicle body crossbeam 200. In this way, the groove crossbeam body of the vehicle body crossbeam 200 may form, in a transverse direction, connection sections that are respectively connected to the longitudinal beam and the connection plate. Outer surfaces of corresponding connection sections are configured to be respectively joined to the longitudinal beam and the connection plate. When joined to only one of the longitudinal beam and the connection plate, the connection section is a longitudinal beam connection section or a connection plate connection section.

Therefore, positions of the supporting-plate reinforcing rib 207 and/or the inclined plate 205 may be disposed corresponding to the connection section. When the vehicle is impacted in a longitudinal direction, the vehicle body crossbeam 200 bears a collision force transferred by the longitudinal beam, and a position in which the connection section is joined to the longitudinal beam and the connection plate bears the largest force. In this case, the supporting-plate reinforcing rib 207 and the inclined plate 205 can support the groove crossbeam body and withstand collision impact, thereby preventing the vehicle body crossbeam 200 from being deformed in a position of the connection section, and improving an anti-collision capability of the vehicle body structure.

For example, in the implementation of the vehicle body structure described below, referring to FIG. 2, the vehicle body crossbeam 200 is formed as the front crossbeam 210. The front crossbeam 210 is separately connected to a left front longitudinal beam and a right front longitudinal beam, and in this implementation, the front crossbeam 210 is connected to a rear end of the front longitudinal beam. That is, the rear of the front longitudinal beam 100 stops at the front crossbeam 210. Further, the rear end of the front longitudinal beam is merely connected to the front crossbeam 210, but is not connected other components. In another implementation, the front longitudinal beam 100 whose rear stops at the front crossbeam may further extend outward in a transverse direction to reach components such as the sill inner plate. Correspondingly, the connection section in this implementation includes a first connection section and a second connection section that are symmetrically disposed in a length direction of the groove crossbeam body at an interval. The first connection section is configured to be connected to the corresponding front longitudinal beam 100, and the second connection section is configured to be connected to a corresponding connection plate. The connection plate may be disposed on an inner side and/or an outer side of the front longitudinal beam 100 according to an actual requirement. The supporting plate 203 includes a first supporting plate 203A and a second supporting plate 203B that are disposed in a length direction of the groove crossbeam body at an interval. The inclined plate 205 at an outer end of the first supporting plate 203A is aligned with an outer end of the first connection section in a longitudinal direction. The inclined plate 205 at an outer end of the second supporting plate 203B is aligned with an outer end of the second connection section in a longitudinal direction. It should be noted that in the present disclosure, "align" is that projections of two components are at least partially overlapped in a direction (for example, the longitudinal direction or the vertical direction in the present disclosure).

Specifically, the connection plate may be disposed on the inner side of the corresponding front longitudinal beam 100, for example, formed as the inner connection plate 410 described below. Correspondingly, each of the first connection section and the second connection section includes a longitudinal beam connection section and a connection plate connection section that are disposed adjacent to each other. The connection plate connection section is located on an inner side of the corresponding longitudinal beam connection section and is configured to be connected to the inner connection plate 410. The supporting plate 203 further includes a third supporting plate 203C connected between the first supporting plate 203A and the second supporting plate 203B in sequence. Inclined plates 205 at two ends of the third supporting plate 203C are respectively aligned with inner ends of corresponding connection plate connection sections in a longitudinal direction.

In this implementation, a bottom wall of the groove crossbeam body is provided with a first mounting hole 701a. The vehicle body crossbeam 200 further includes a reinforcing plate 208 covering the crossbeam bottom wall 201. The reinforcing plate 208 is provided with a second mounting hole 701b coaxial with the first mounting hole 701a, to improve the strength of an opening position of the vehicle body crossbeam 200. The first mounting hole 701a and the second mounting hole 701b may be configured to mount a vehicle element, for example, a battery tray carrying a battery pack. That is, the first mounting hole 701a and the second mounting hole 701b are the foregoing battery tray fastening holes 701.

Specifically, the groove crossbeam body is provided with an upward opening, and a top edge of the groove crossbeam body folds outward to form a crossbeam opening flange 200a extending in a length direction of the groove crossbeam body. Therefore, when the vehicle body crossbeam 200 according to the first aspect of the present disclosure is applied to the vehicle body structure, the vehicle body crossbeam 200 may be welded on the lower surface of the floor panel 300 by using the crossbeam opening flange 200a, so that the vehicle body crossbeam 200 and the floor panel 300 form the supporting structure having the closed cross-section, thereby enhancing the strength of the floor panel to reduce collision deformation of the floor panel, and preventing the floor panel 300 from excessively folding upward during a front collision. Therefore, the deformed floor panel 300 is prevented from entering the occupant compartment to injure an occupant or compress a living space inside the occupant compartment. Further, an end portion of the crossbeam side wall 202 may further fold inward or outward to form a crossbeam end portion flange 200b. An end portion of the crossbeam bottom wall 201 extends outward to form a crossbeam-bottom-wall joining side 200c, so that the vehicle body crossbeam 200 can be joined to other components of the vehicle body structure such as the floor longitudinal beam and the sill inner plate by the crossbeam end portion flange 200b and the crossbeam-bottom-wall joining side 200c.

The forgoing introduces some parts such as the vehicle body crossbeam in the vehicle body structure. The following generally introduces vehicle body structures in some implementations.

According to a second aspect of the present disclosure, the present disclosure further provides a vehicle body structure. In FIG. 3 to FIG. 46, some implementations of the vehicle body structure according to the second aspect of the present disclosure are shown. The vehicle body structure may include a front longitudinal beam 100, a front compartment crossbeam 220, and a dash panel 320. The front longitudinal beam 100 includes a left front longitudinal beam and a right front longitudinal beam that are disposed at an interval in a transverse direction. The front compartment crossbeam 220 is mounted on the left front longitudinal beam and the right front longitudinal beam, and is located in front of the dash panel 320, and a projection area of the front compartment crossbeam 220 on the dash panel 320 in an X direction at least partially covers a projection PA of a preset area AA surrounding a pedal center point A on the dash panel 320 in the X direction. A front collision usually occurs as the vehicle travels, and in this case, the foot of a driver is usually put on a pedal. When the collision occurs, because an occupant fails to react in time (for example, steps on an accelerator pedal by mistake) or attempts to take a risk avoidance measure (for example, steps on a brake pedal to decelerate the vehicle), elements in the front portion of the vehicle move backward due to the collapse of the front longitudinal beam 100 and collision impact. As a result, the dash panel 320 deforms or even enters the occupant compartment to easily injure the feet of the occupant. Therefore, in the foregoing technical solution, projections of the front compartment crossbeam 220 and a pedal center area on the dash panel 320 in a longitudinal direction of the vehicle are at least partially overlapped, so that the front compartment crossbeam 220 can withstand impact before the dash panel 320 does, to prevent a vehicle power apparatus such as a motor from moving backward due to collision impact to injure the occupants.

Specifically, the preset area surrounding the pedal center point may be set according to an actual requirement or with reference to standards for vehicle collision safety of different countries. The size and position of the preset area surrounding the pedal center point are not specifically limited in the present disclosure. In the exemplary implementation shown in FIG. 4, the preset area AA surrounding the pedal center point A may include, but is not limited to, a pedal center point A, a pedal left projection points A1 150 mm away from the pedal center point A in a transverse direction, and a pedal right projection point A2 150 mm away from the pedal center point A in a transverse direction. To be specific, the preset area AA surrounding the pedal center point A may be at least one of the pedal center point A, the pedal left projection points A1 or the pedal right projection point A2, to form more all-around protection for feet and activity space around the feet. In an implementation, the preset area AA surrounding the pedal center point A may be a surrounding area with the pedal center point A as the center, a surrounding area with the pedal left projection point A1 as the center or a surrounding area with the pedal right projection point A2 as the center. In addition, in some implementations, the preset area AA surrounding the pedal center point A includes an area covering 150 mm from the pedal center point A as the center in a transverse direction.

It can be learned from actual life experience that, when determining that the vehicle is about to have a front collision, to avoid an accident or reduce damage caused by an accident, the driver usually steps on the brake pedal immediately as an emergency measure. Therefore, the preset area AA surrounding the pedal center point A may be a preset area surrounding a brake pedal center point A. Alternatively, the preset area surrounding the pedal center point may include a preset area surrounding an accelerator pedal center point A2 and/or a preset area surrounding a clutch pedal center point A1, that is, a preset area surrounding the center point of at least one of the brake pedal, the accelerator pedal or the clutch pedal.

Figure 5:
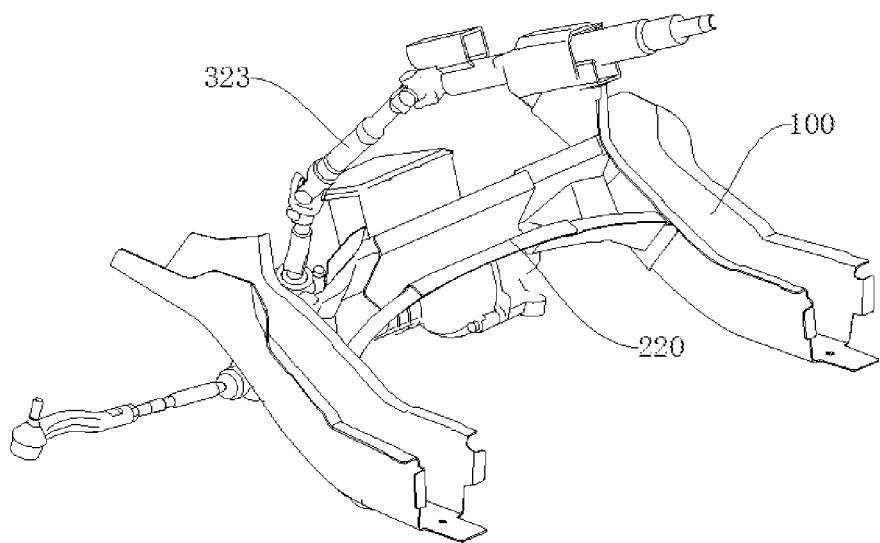
FIG. 5 is a partial structural perspective of a vehicle body structure according to the present disclosure, where a steering column is shown.
Figure 6:
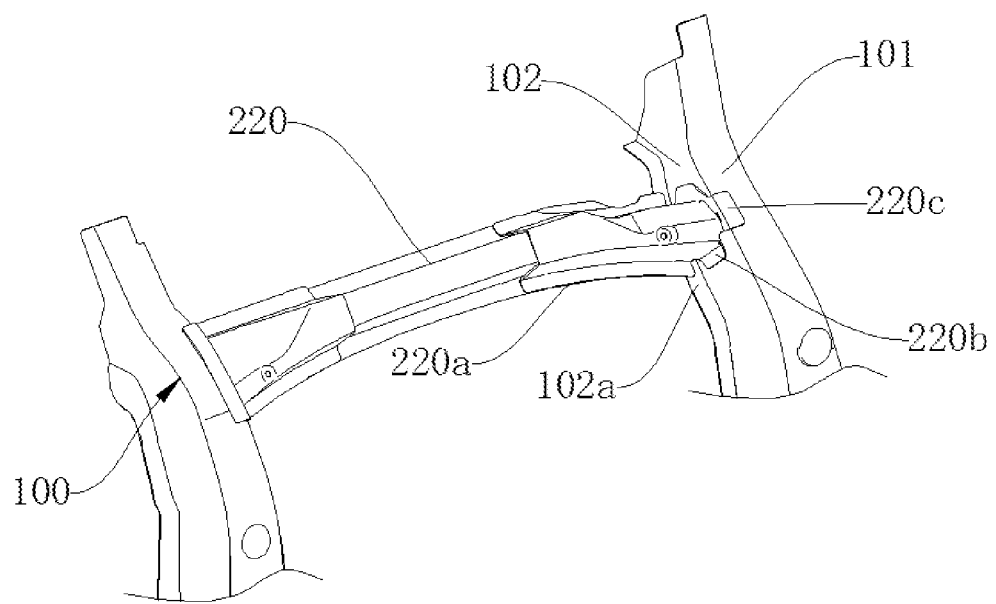
FIG. 6 is a detailed diagram of a connection relationship between the front longitudinal beam and the front compartment crossbeam in FIG. 3.

To improve the overall strength of the vehicle body structure, the front compartment crossbeam 220 may be connected to a front surface of the dash panel 320. Alternatively, the front compartment crossbeam 220 is at least partially located right behind a vehicle power apparatus (for example, a motor and an engine), to stop the vehicle power apparatus from moving backward to deform the dash panel 320 to interfere with the pedal to injure the feet of the occupant during a front collision. In addition, the dash panel 320 is further formed with a steering column via 322. Referring to FIG. 5 and FIG. 6, the steering column via 322 may be located above the front compartment crossbeam, so that a lower section of a steering column 323 that passes through the steering column via 322 is located in front of the front compartment crossbeam 220. Therefore, during a front collision, the front compartment crossbeam 220 may further stop the steering column 323. In some implementations, a groove for avoiding the steering column 323 may be designed on the front compartment crossbeam. To provide the dash panel 320 with sufficient strength in a position of the steering column via 322, the front compartment crossbeam 220 may be disposed in tight contact with the steering column via 322. In this way, during the collision, the reinforcement provided by the front compartment crossbeam 220 prevents collision deformation of the dash panel 320 in the position of the steering column via 322. In addition, in some implementations, the front compartment crossbeam 220 may be located in front of the dash panel 320 at an interval instead of being connected to the dash panel 320.

In this implementation, as shown in FIG. 6, a position, correspondingly connected to the front compartment crossbeam 220, of the front longitudinal beam 100 is formed as a groove structure that extends in a longitudinal direction of the vehicle and has an upward opening, and includes a first longitudinal beam bottom wall 101 and a first longitudinal beam side wall 102. An upper edge at the opening of the groove structure of the front longitudinal beam 100 folds outward to form a first-longitudinal-beam-side-wall flange 102a extending in a longitudinal direction. The front compartment crossbeam 220 is formed as a groove structure with an upward opening. An end portion of the groove structure of the front compartment crossbeam 220 is at least partially connected to the first longitudinal beam bottom wall 101, so that the front compartment crossbeam 220 can stop the movement of elements in the front of the vehicle adequately. Optionally, the front compartment crossbeam 220 may be alternatively connected to the left front longitudinal beam and the right front longitudinal beam in any other appropriate manner.

In addition, to adapt to the vehicle body structure, a staggering distance in a Y direction between projections of a front end and a rear end of the front longitudinal beam 100 in a Z direction is less than or equal to 80 mm. That is, the projections of the front end and the rear end of the front longitudinal beam in a transverse direction do not have an excessively large offset in a transverse direction, thereby ensuring adequate straightness of the front longitudinal beam in a transverse direction, so as to ensure the strength of the front longitudinal beam.

To ensure a stable connection relationship between the front compartment crossbeam 220 and the front longitudinal beam 100, an edge at an opening of the groove structure of the front compartment crossbeam 220 folds outward (namely, folds forward or backward) to form a first flange 220a extending in a transverse direction, and the end portion of the groove structure folds outward (namely, folds forward or backward) to form a second flange 220b extending in a vertical direction. The end portion is further formed with a third flange 220c extending in a longitudinal direction. The first flange 220a is joined to the first-longitudinal-beam-side-wall flange 102a. The second flange 220b is joined to the first longitudinal beam side wall 102. The third flange 220c is joined to a longitudinal beam bottom wall 103. In actual manufacturing, connection manners between the flanges and the front longitudinal beam 100 may be joining and welding, to improve the connection strength between the front compartment crossbeam 220 and the front longitudinal beam 100, thereby ensuring that the front compartment crossbeam 220 can adequately withstand impact from the vehicle power apparatus.

The front compartment crossbeam 220 may be formed as a sectional structure, to facilitate production of the front compartment crossbeam 220. The front compartment crossbeam 220 may include a crossbeam body and end portion connection sections connected to two ends of the crossbeam body. The width of the opening of the groove structure of the front compartment crossbeam 220 gradually becomes larger along the crossbeam body to the end portion connection sections, to facilitate the machining of the flanges joined to the front longitudinal beam 100. In an alternative implementation, the front compartment crossbeam 220 may be alternatively formed as an integral structure.

Referring to FIG. 2, to adapt to the overall structure of the vehicle, the front longitudinal beams 100 is formed with, along a wheel envelope, an inward concave portion 105 for avoiding a wheel. That is, the front longitudinal beam 100 is inward concave in a position of the inward concave portion 105 to ensure the steering of the vehicle. As a result, during a front collision, the front longitudinal beam 100 tends to be deformed and bent in the position of the inward concave portion 105 to press the dash panel 320 and other components mounted in the front portion of the vehicle and affect the collapse and energy-absorption of the front longitudinal beam 100. Therefore, in the present disclosure, the front compartment crossbeam 220 is connected between the inward concave portion 105 of the left front longitudinal beam and the right front longitudinal beam to support the two front longitudinal beams 100, thereby reducing bending of the front longitudinal beam 100 in the position of the inward concave portion 105 during a front collision. Therefore, the front longitudinal beam 100 can collapse and absorb energy more adequately in a longitudinal direction of the vehicle to protect other elements of the vehicle and occupants in the vehicle. To further improve the strength of the front longitudinal beam 100, a reinforcing plate may be connected to a position, corresponding to the inward concave portion 105, of the inner wall of the front longitudinal beam 100. For example, the position is reinforced through welding.

Figure 7:
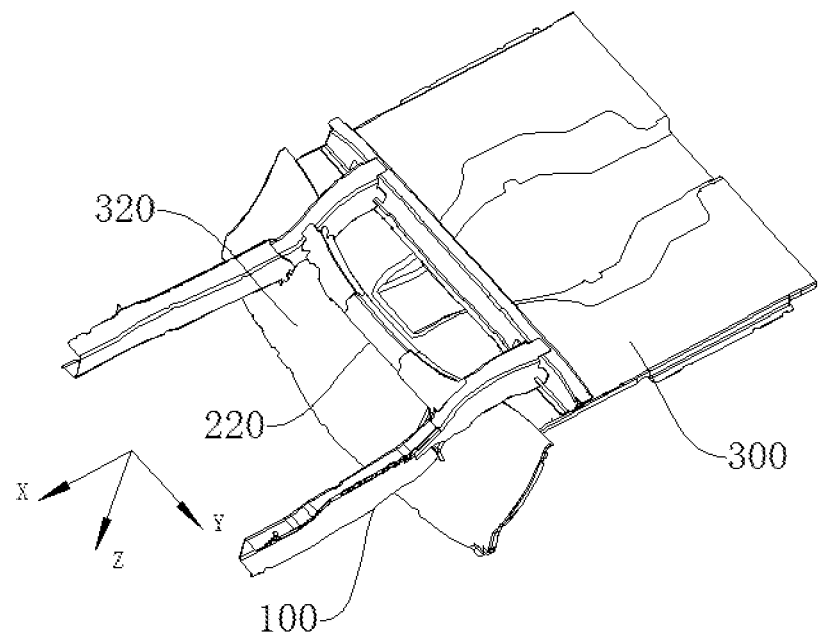
FIG. 7 is a partial structural perspective bottom view of a vehicle body structure according to the present disclosure, where a front longitudinal beam, a front compartment crossbeam, a dash panel, and a floor panel are shown.
Figure 8:
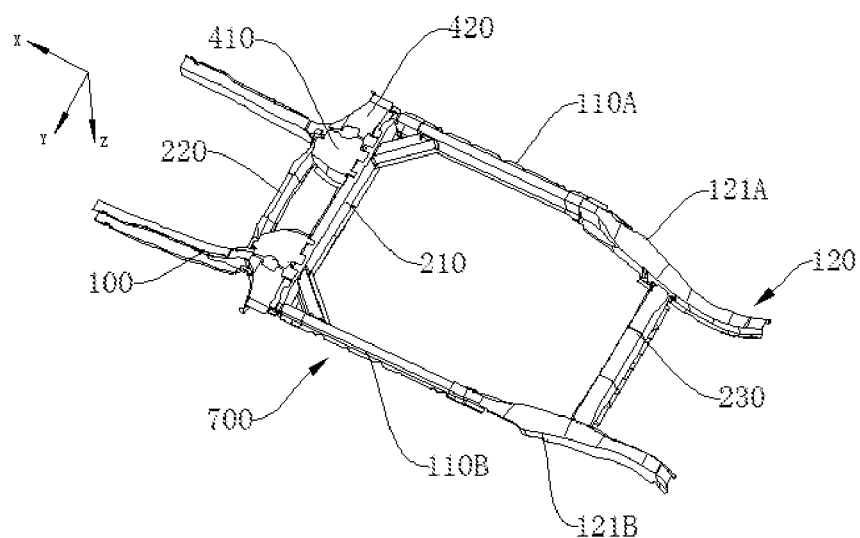
FIG. 8 is a schematic diagram of a carrying frame in a vehicle body structure according to the present disclosure.
Figure 9:
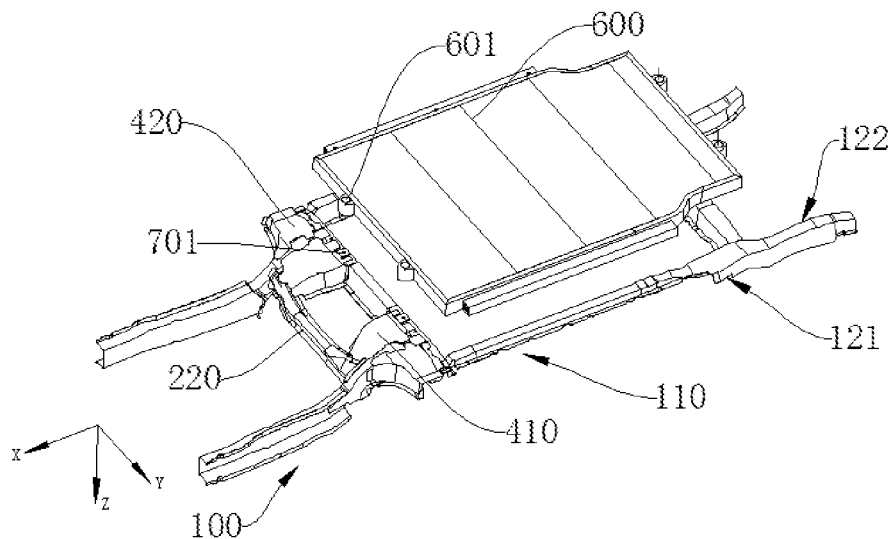
FIG. 9 is another schematic diagram of a carrying frame in a vehicle body structure according to the present disclosure, where a battery tray is shown.
Figure 10:
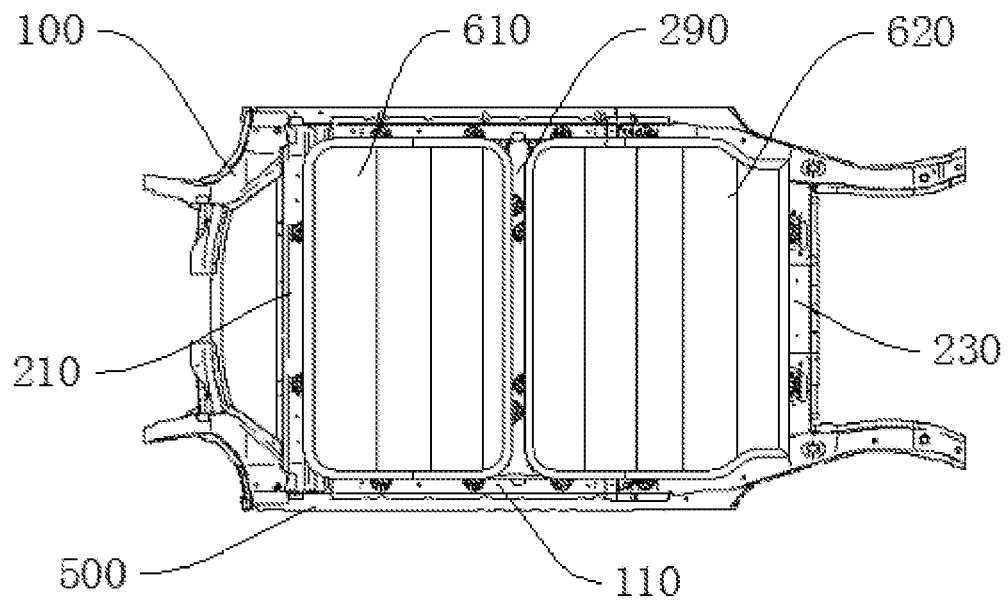
FIG. 10 is still another schematic diagram of a carrying frame in a vehicle body structure according to the present disclosure, where a battery tray is formed as a separate structure.

The vehicle body structure further includes a floor panel 300 and a carrying frame 700. As shown in FIG. 7, the floor panel 300 is located behind the front compartment crossbeam 220 and a front end of the floor panel 300 is connected to the dash panel 320, so that the occupant compartment is defined behind the dash panel 320 and above the floor panel 300. The carrying frame 700 is configured to mount other elements of the vehicle, for example, configured to mount a battery tray 600 for carrying a battery pack. Specifically, as shown in FIG. 8 to FIG. 10, the carrying frame 700 may at least include a front crossbeam 210, a vehicle body longitudinal beam, and a floor rear crossbeam 230. The front crossbeam 210 and the floor rear crossbeam 230 are both fastened on a lower surface of the floor panel 300. The vehicle body longitudinal beam is connected to the floor panel 300. The front crossbeam 210 is disposed behind the front compartment crossbeam 220 at an interval and is mounted near the dash panel 320. It should be noted that the "near" herein is that among all crossbeams mounted below the floor panel 300, a distance between the front crossbeam 210 and the dash panel 320 is the shortest. The floor rear crossbeam 230 is disposed behind the front crossbeam 210 at an interval. There are two vehicle body longitudinal beams. The two vehicle body longitudinal beams are disposed at an interval in a transverse direction and are at least partially located between the front crossbeam 210 and the floor rear crossbeam 230, to limit a mounting space of the battery tray 600. Specifically, the vehicle body longitudinal beam may include a floor longitudinal beam 110 fastened on the lower surface of the floor panel 300 and/or a sill inner plate 500 fastened on a lateral edge of the floor panel 300. That is, the battery tray 600 may be fastened on the floor longitudinal beam 110, may be fastened on an inner plate of a door frame, or may be fastened on both the floor longitudinal beam 110 and the inner plate of the door frame, to facilitate the arrangement of mounting points according to the structures of different battery trays 600. In this implementation, when the carrying frame 700 is configured to mount a battery tray, the front crossbeam 210, the floor longitudinal beam 110, and the floor rear crossbeam 230 may be referred to as a battery pack front mounting crossbeam 210, a battery pack mounting longitudinal beam 110, and a battery pack rear mounting crossbeam 230 in sequence.

The carrying frame 700 may be a frame structure formed by fitting of the front crossbeam 210, the two floor longitudinal beams 110, and the floor rear crossbeam 230, or by using the implementation shown in FIG. 8 and FIG. 9. That is, the floor longitudinal beam 110 includes a first floor longitudinal beam 110a and a second floor longitudinal beam 110b that are respectively connected to two ends of the front crossbeam 210. The vehicle body structure further includes a rear longitudinal beam 120. The rear longitudinal beam 120 includes a first rear longitudinal beam and a second rear longitudinal beam that are respectively connected to a rear end of a corresponding floor longitudinal beam 110. The floor rear crossbeam 230 is connected between the rear longitudinal beams 120, to provide the rear longitudinal beam 120 with a rear-longitudinal-beam front section 121 and a rear-longitudinal-beam rear section 122 that are respectively located on the front side and the rear side of the floor rear crossbeam 230. The carrying frame 700 is formed as the front crossbeam 210, the first floor longitudinal beam 110a, a first rear-longitudinal-beam front section 121A, the floor rear crossbeam 230, a second rear-longitudinal-beam front section 121B, and the second floor longitudinal beam 110b that are connected in sequence, to ensure that a space in a lower portion of the floor panel 300 can be fully used. Specifically, a crossbeam and a longitudinal beam of the carrying frame 700 may be connected by means of joining and welding, threaded connection, or the like, or may be connected by a technical means well known in the art such as adding a connecting member. This is not specifically limited in the present disclosure. By using the structural design of the carrying frame 700, as many as battery packs can be arranged below the floor panel 300, thereby maximizing a range of the vehicle. In addition, the floor longitudinal beam is connected to the rear longitudinal beam, thereby further enhancing the strength of the vehicle body structure.

Figure 11:
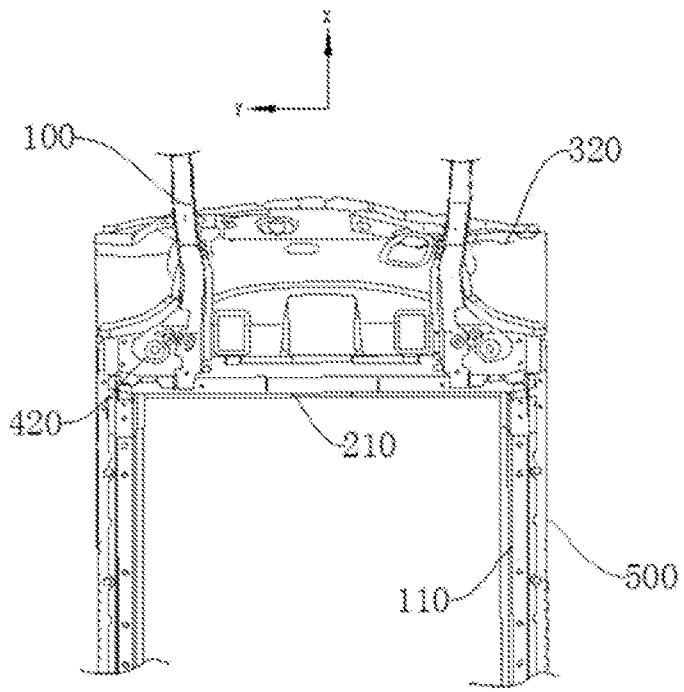
FIG. 11 shows a deformation manner of the carrying frame in FIG. 8, where the carrying frame further includes a sill inner plate.

To improve the strength of the carrying frame 700, as shown in FIG. 10 and FIG. 11, the carrying frame 700 may further include a sill inner plate 500 disposed on two sides of the floor panel 300. The sill inner plate 500 extends in a longitudinal direction, is located on an outer side of a corresponding floor longitudinal beam 110, and is joined to the floor longitudinal beam 110 and the front crossbeam 210. A reinforcing beam may be connected between the front crossbeam 210 and the floor longitudinal beam 110 to form a triangular reinforcing structure. That is, corner portions formed by the reinforcing beam, the front crossbeam 210, and the floor longitudinal beam 110 form a triangle together. Therefore, the strength at the corner of an intersection between the crossbeam and the longitudinal beam is increased to improve the strength of the carrying frame 700, thereby withstanding more adequately the weight of the battery pack and a collision force. Alternatively, the reinforcing beam may be alternatively formed as an L-shaped beam, so that the reinforcing beam and the corner portions that are formed by the front crossbeam 210 and the floor longitudinal beam 110 form the rectangular frame structure together, thereby improving an anti-collision capability of the vehicle body structure.

There may be any appropriate joining relationship between the front crossbeam 210, the floor longitudinal beam 110, and the sill inner plate 500. In an optional implementation, for a connection manner between the front crossbeam 210 and the floor longitudinal beam 110, refer to the implementations shown in FIG. 12 to FIG. 15. The two floor longitudinal beams 110 are respectively connected to the two ends of the front crossbeam 210, and the floor longitudinal beams 110 are respectively joined to the crossbeam bottom wall 201, the crossbeam side wall 202, and the crossbeam opening flange 200a. Specifically, an end portion of the floor longitudinal beam 110 is formed as a groove structure with an upward opening and includes a floor-longitudinal-beam inner side wall 112A, a floor-longitudinal-beam bottom wall 111, and a floor-longitudinal-beam outer side wall 112B. An upper edge at the opening of the groove structure of the floor longitudinal beam 110 folds outward (to the left and right) to respectively form a floor-longitudinal-beam-inner-side-wall first flange 110a and a floor-longitudinal-beam-outer-side-wall flange 110b that extend in a longitudinal direction. The floor longitudinal beam 110 is fastened to a lower surface of the floor panel 300 by the floor-longitudinal-beam-inner-side-wall first flange 110a. An end portion of the floor-longitudinal-beam inner side wall 112A folds (inward and extends in a vertical direction) to form a floor-longitudinal-beam-inner-side-wall second flange 110c. An end portion of the floor-longitudinal-beam bottom wall 111 extends outward to form a floorlongitudinal-beam-bottom-wall joining side 110d extending in a transverse direction. The floor-longitudinal-beam-inner-side-wall first flange 110a is joined to the crossbeam opening flange 200a. The floor-longitudinal-beam-inner-side-wall second flange 110c is joined to the crossbeam side wall 202. The floor-longitudinal-beam-bottom-wall joining side 110d is joined to the crossbeam bottom wall 201.

Figure 14:
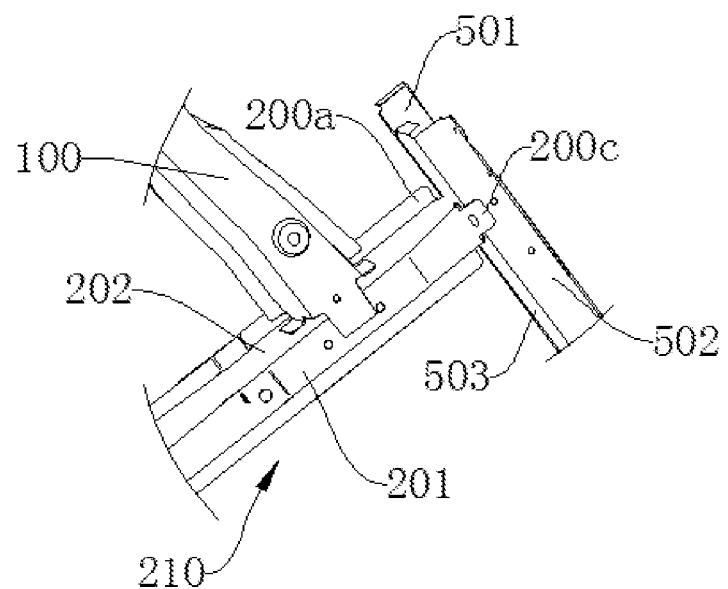
FIG. 14 is a detailed diagram of a connection relationship between the front crossbeam and the sill inner plate in FIG. 11.
Figure 15:
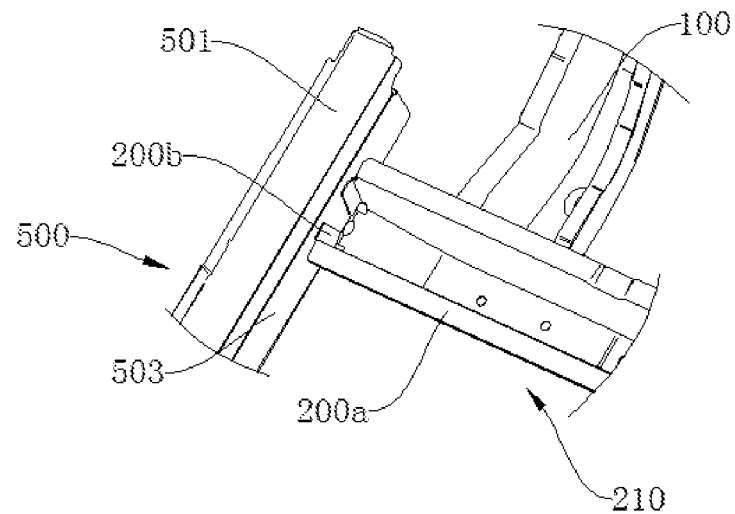
FIG. 15 is a detailed diagram from another perspective of a connection relationship between the front crossbeam and the sill inner plate in FIG. 11.

As shown in FIG. 14, the sill inner plate 500 is formed as a U-shaped groove structure with an outward opening, and includes an inner plate top wall 501 and an inner plate bottom wall 502 that are disposed opposite to each other, and an inner plate side wall 503 connected between the inner plate top wall 501 and the inner plate bottom wall 502. As shown in FIG. 11, a joining relationship between the sill inner plate 500 and the floor longitudinal beam 110 may be that: the floor longitudinal beam 110 is joined to the inner plate bottom wall 502 by the floor-longitudinal-beam-outer-side-wall flange 110b. For a joining manner between the front crossbeam 210 and the sill inner plate 500, refer to the implementation shown in FIG. 13 and FIG. 14. The front crossbeam 210 is respectively joined to the inner plate side wall 503 and the inner plate bottom wall 502 by the crossbeam end portion flange 200b and the crossbeam-bottom-wall joining side 200c.

Figure 16:
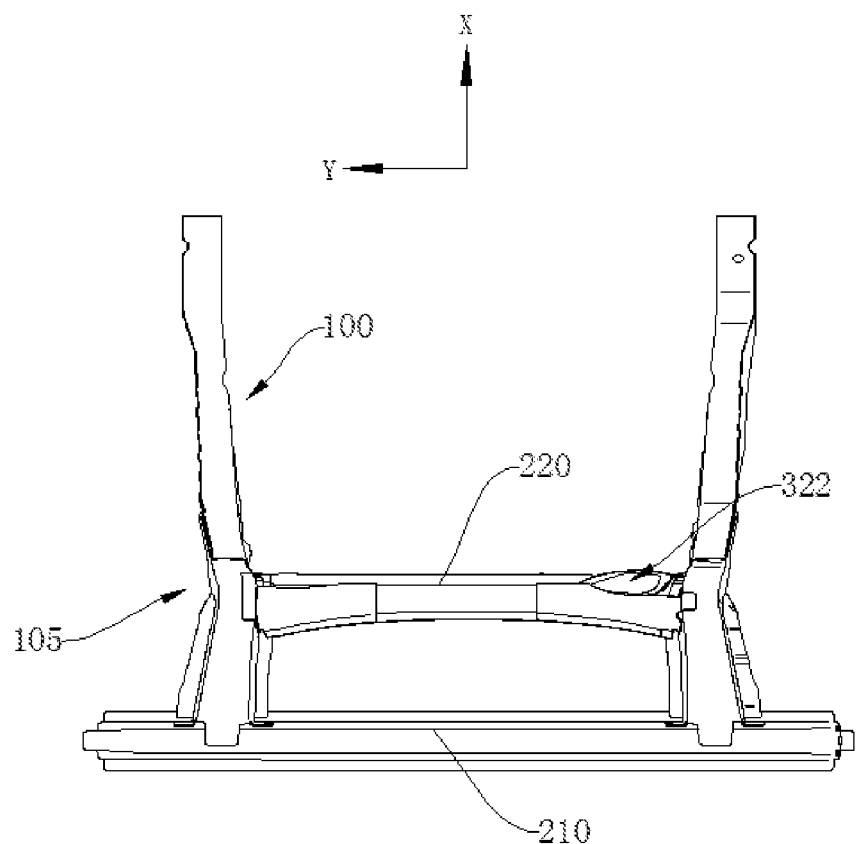
FIG. 16 is a schematic diagram of a first implementation of a force transfer structure in a vehicle body structure according to the present disclosure.
Figure 17:
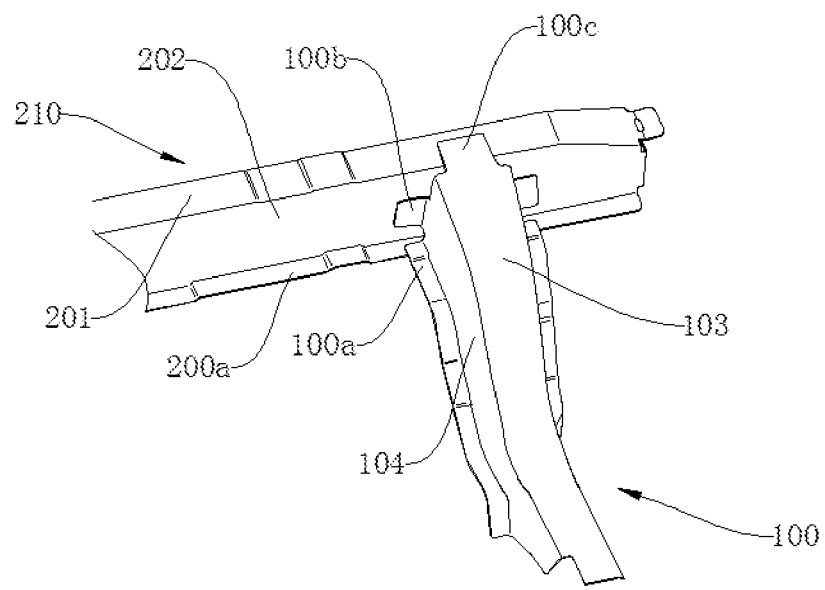
FIG. 17 is a detailed diagram of a connection relationship between a front longitudinal beam and a front crossbeam in FIG. 16.

The carrying frame 700 used in the present disclosure is used as a part of a force transfer path of the vehicle body structure. For example, in some implementations described in detail in the following, specifically, the implementation shown in FIG. 16 and FIG. 17 is used as an example. When a rear end of the front longitudinal beam 100 is joined to the front crossbeam 210 in the carrying frame 700, during a front collision of the vehicle, the front longitudinal beam 100 first bears impact, and an impact force is transferred from the rear end of the front longitudinal beam 100 to the front crossbeam 210 and is distributed to a vehicle body structure in the rear of the vehicle along the floor longitudinal beam 110 and the sill inner plate 500. Therefore, collision energy can be absorbed by the entire vehicle, and deformation of the dash panel of the vehicle is reduced, so as to protect drivers and passengers in the occupant compartment. In addition, the front crossbeam 210, the sill inner plate 500, and the floor longitudinal beam 110 are joined to each other, so that the strength of the carrying frame 700 can be improved. Therefore, it can be ensured that a relatively large number of battery packs are mounted in the carrying frame 700 to improve a range of the vehicle, and a collision (including a front collision and a side collision) deformation degree of the carrying frame 700 can be reduced, to prevent the carrying frame 700 from being deformed to press the battery packs to cause a fire.

Figure 44:
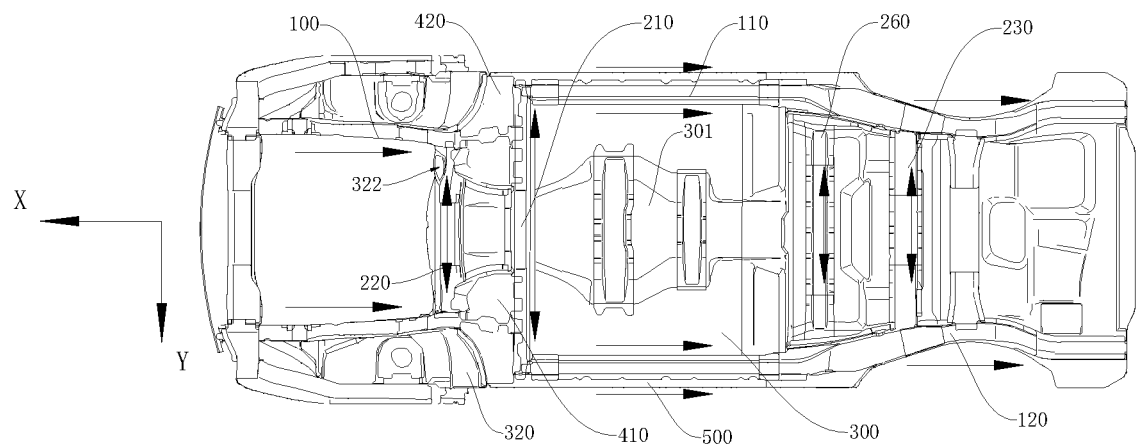
FIG. 44 is a bottom view of an implementation of a vehicle body structure according to the present disclosure.
Figure 45:
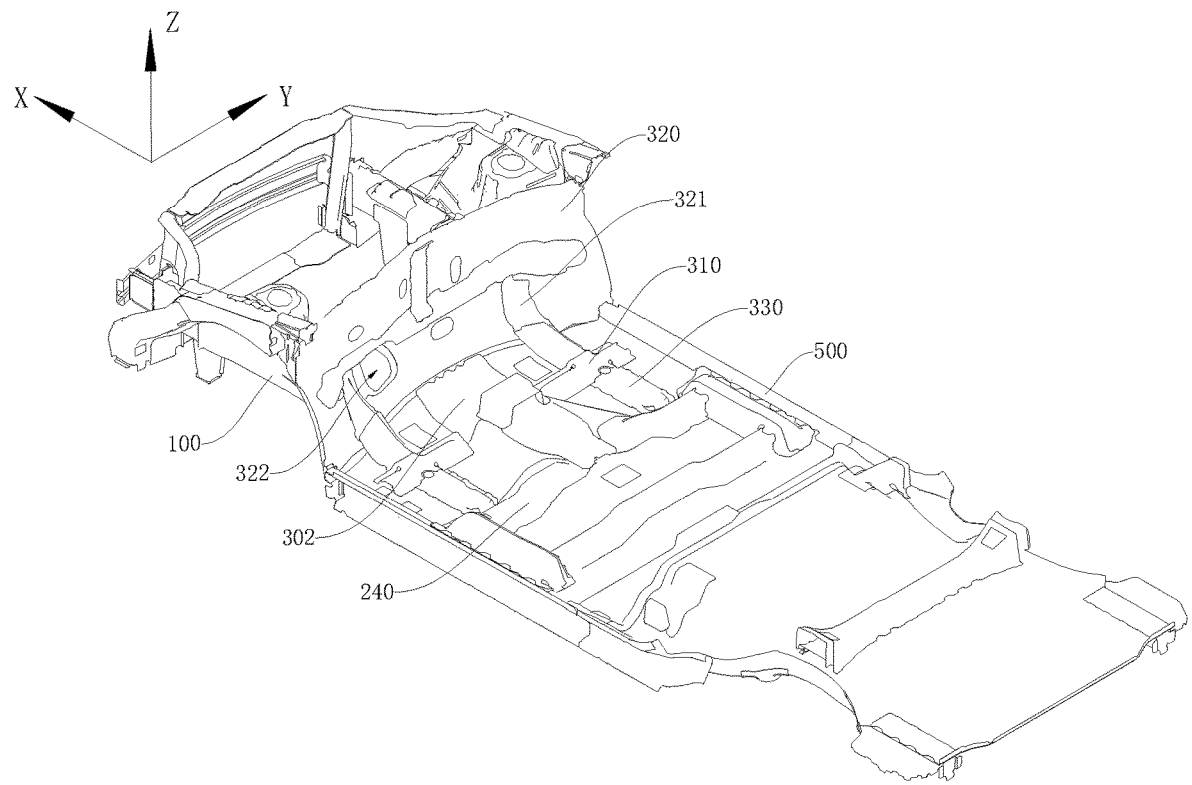
FIG. 45 is perspective view of an implementation of a vehicle body structure according to the present disclosure.
Figure 46:
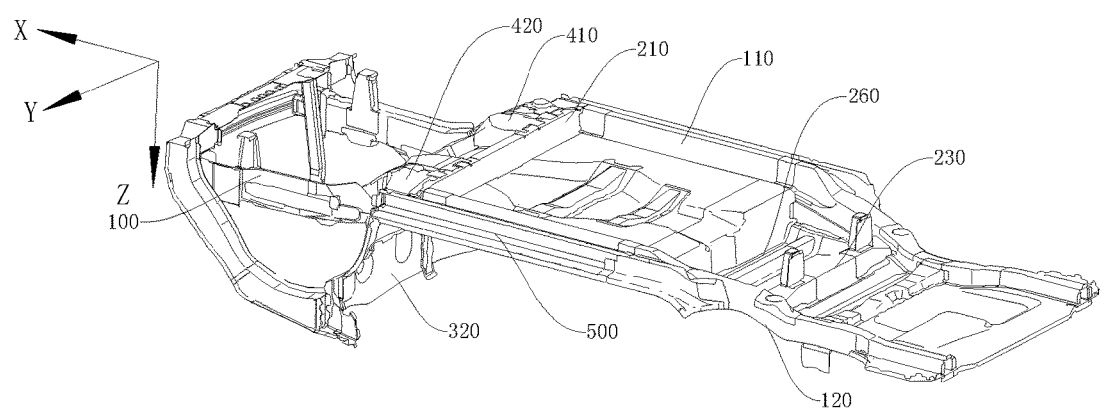
FIG. 46 is perspective view from another perspective of an implementation of a vehicle body structure according to the present disclosure.

The vehicle body structure may further include a rear seat mounting crossbeam 260 (referring to FIG. 44 and FIG. 46). The rear seat mounting crossbeam 260 is connected between the rear longitudinal beams 120 and is located in front of the floor rear crossbeam 230 at an interval. The carrying frame 700 may further include the rear seat mounting crossbeam 260, so as to increase the quantity of mounting points for the battery tray 600 and the carrying frame 700, thereby keeping battery packs stably mounted. In addition, when the carrying frame 700 used in the present disclosure is used as a part of the force transfer path of the vehicle body structure, the rear seat mounting crossbeam 260 can further extend a force transfer path between the rear longitudinal beams 120.

When the carrying frame 700 is configured to mount the battery tray 600, the front crossbeam 210 is formed as a battery pack front mounting crossbeam, the floor longitudinal beam 110 is formed as a battery pack mounting longitudinal beam, and the floor rear crossbeam 230 is formed as a battery pack rear mounting crossbeam. Moreover, the carrying frame 700 is further provided with a battery tray fastening hole 701, configured to fasten the battery tray 600. Correspondingly, an edge of the battery tray 600 is provided with a mounting bracket 601, so that the edge of the battery tray 600 is not in direct contact with the carrying frame 700, thereby ensuring that the battery tray 600 does not directly bear impact during a collision, so as to protect the battery packs. A position of the mounting bracket 601 is aligned with a position of the battery tray fastening hole 701, and a fastening hole is provided coaxially to mount the battery tray 600 on the carrying frame 700 by using a fastening element.

In some implementations, the battery tray 600 may be formed as an integral structure (as shown in FIG. 9) or formed as a separate structure (as shown in FIG. 10). Specifically, the battery tray 600 may include a first battery tray 610 and a second battery tray 620 that are disposed in a longitudinal direction at an interval. The carrying frame 700 further includes a battery pack middle mounting crossbeam 290 disposed between the battery pack front mounting crossbeam 210 and the battery pack rear mounting crossbeam 230 at an interval. The first battery tray 610 is respectively joined to the battery pack front mounting crossbeam 210, the vehicle body longitudinal beam, and the battery pack middle mounting crossbeam 290. The second battery tray 620 is respectively joined to the battery pack middle mounting crossbeam 290, the vehicle body longitudinal beam, and the battery pack rear mounting crossbeam 230. Specifically, the battery pack middle mounting crossbeam 290 may be joined to the vehicle body longitudinal beam, or an existing crossbeam in the vehicle body structure, for example, the rear seat mounting crossbeam 260, may be used.

To evenly distribute the collision energy of the vehicle on the car body structure to reduce damage to single components of the vehicle, the carrying frame 700 may further be integrally or partially used as a collision force transfer structure to help distribute the collision force.

As shown in FIG. 16 and FIG. 17, a first implementation of the vehicle body structure distributing a collision force is provided. Rear ends of the left front longitudinal beam and the right front longitudinal beam are respectively connected to the front crossbeam 210. That is, the front longitudinal beam 100 stops at the front crossbeam 210, so that collision impact is transferred from the front longitudinal beam 100 to the front crossbeam 210 through the connection between the front longitudinal beam 100 and the front crossbeam 210, thereby preventing a rear leg of the front longitudinal beam from entering the occupant compartment. In addition, the front compartment crossbeam 220, the left front longitudinal beam, the front crossbeam 210, and the right front longitudinal beam form a closed-loop frame. In one aspect, a collision force transfer path of the vehicle is extended, thereby facilitating the distribution of collision energy. In another aspect, the closed-loop frame provides the vehicle body structure with higher strength, so that the vehicle body structure can withstand initial collision load and backward impact of the elements in the front portion of the vehicle, to protect occupants in the vehicle and other elements such as battery packs in the vehicle.

Specifically, the front crossbeam 210 is formed as a groove structure with an upward opening and includes a crossbeam bottom wall 201 and a crossbeam side wall 202. An upper edge at the opening of the first groove structure of the front crossbeam 210 folds outward to form a crossbeam opening flange 200a, and the front crossbeam 210 is connected to a lower surface of the floor panel 300 by the crossbeam opening flange 200a.

The front longitudinal beam 100 may be fixedly connected to the front crossbeam 210 in any appropriate connection manner. In an optional implementation, as shown in FIG. 17, the front longitudinal beam 100 is respectively joined to the crossbeam bottom wall 201, the crossbeam side wall 202, and the crossbeam opening flange 200a. Specifically, the rear end of the front longitudinal beam 100 is formed as a groove structure with an upward opening and includes a longitudinal beam bottom wall 103 and a longitudinal beam side wall 104. An upper edge at the opening of the groove structure in the rear end of the front longitudinal beam 100 folds outward to form a first longitudinal beam flange 100a extending in a longitudinal direction. An end portion of the longitudinal beam side wall 104 folds outward to form a second longitudinal beam flange 100b extending in a vertical direction. An end portion of the longitudinal beam bottom wall 103 extends outward to form a longitudinal-beam-bottom-wall joining side 100c extending in a transverse direction. The first longitudinal beam flange 100a is joined to the crossbeam opening flange 200a, the second longitudinal beam flange 100b is joined to the crossbeam side wall 202, and the longitudinal-beam-bottom-wall joining side 100c is joined to the crossbeam bottom wall 201, to ensure that the rear end of the front longitudinal beam 100 is stably connected to the front crossbeam 210.

In this implementation, there is a continuous transition between a position, correspondingly connected to the front compartment crossbeam 220, of the front longitudinal beam 100 and the groove structure in the rear end of the front longitudinal beam 100. That is, the front longitudinal beam 100 is formed as a continuous groove structure from a mounting position of the front compartment crossbeam 220 to the rear end of the front longitudinal beam 100, to improve the anti-bending strength of the front longitudinal beam 100, thereby preventing the front longitudinal beam 100 from being bent to enter the occupant compartment during a front collision, and facilitating manufacturing of the front longitudinal beam 100.

To further strengthen the connection relationship between the front longitudinal beam 100 and the front crossbeam 210, the vehicle body structure may further include an inner connection plate 410 and an outer connection plate 420 or one of the inner connection plate 410 and the outer connection plate 420. For example, in the implementations shown in FIG. 2, FIG. 8, FIG. 9, FIG. 11, and FIG. 12, the inner connection plate 410 and the outer connection plate 420 are respectively located on an inner side and an outer side of the front longitudinal beam 100, and the inner connection plate 410 is respectively connected to the front compartment crossbeam 220, the front longitudinal beam 100, and the front crossbeam 210. In an alternative implementation, the inner connection plate 410 may be located between the front compartment crossbeam 220 and the front crossbeam 210, and is connected to one of the front compartment crossbeam 220 and the front crossbeam 210. The outer connection plate 420 is respectively connected to the front longitudinal beam 100 and the front crossbeam 210. During a front collision, the inner connection plate 410 and the outer connection plate 420 can further help to distribute collision impact, so that a collision force is transferred from the rear section of the front longitudinal beam 100 to the structure in the rear of the vehicle through the inner and outer connection plates, thereby preventing the rear section of the front longitudinal beam 100 from being deformed and bent and driving the dash panel 320 to be deformed, so that the space of the occupant compartment is prevented from being compressed.

Figure 18:
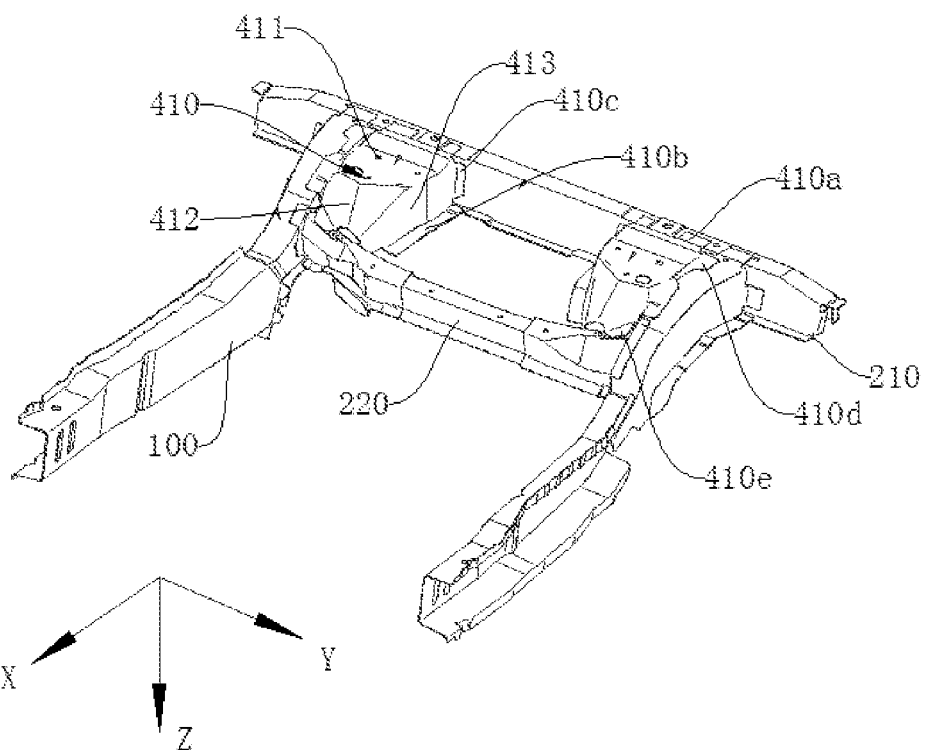
FIG. 18 shows an embodiment of the first implementation of the force transfer structure in the vehicle body structure according to the present disclosure, where an inner connection plate is shown.

The inner connection plate 410 and the outer connection plate 420 may be respectively provided with any appropriate structure. Referring to FIG. 18, the inner connection plate 410 includes an inner connection bottom wall 411. The inner connection bottom wall 411 is provided with an inner-connection-plate first edge, an inner-connection-plate second edge, an inner-connection-plate third edge, and an inner-connection-plate fourth edge that are sequentially connected end to end. The inner-connection-plate first edge extends along the front crossbeam 210 and is joined to the front crossbeam 210. The inner-connection-plate second edge extends along the front longitudinal beam 100 and is joined to the front longitudinal beam 100. Because the front longitudinal beam 220 is located above the front crossbeam 210 in a vertical direction, the inner-connection-plate third edge is connected to a first inner connection side wall 412 extending upward at an angle to adapt to a position relationship between the front compartment crossbeam 220 and the front crossbeam in a vertical direction. The first inner connection side wall 412 is joined to the front compartment crossbeam 220. The inner-connection-plate fourth edge is connected to a second inner connection side wall 413 extending upward. The second inner connection side wall 413 is joined to the front crossbeam 210.

Specifically, the inner-connection-plate first edge extends outward to form an inner-connection-plate first joining side 410a extending in a transverse direction. An upper edge of the second inner connection side wall 413 folds outward to form a second-inner-connection-side-wall first flange 410b extending in a longitudinal direction. An end portion, near the inner-connection-plate first edge, of the second inner connection side wall 413 folds outward to form a second-inner-connection-side-wall second flange 410c extending in a vertical direction. The inner-connection-plate first joining side 410a is joined to the crossbeam bottom wall 201, the second-inner-connection-side-wall first flange 410b is joined to the crossbeam opening flange 200a, and the second-inner-connection-side-wall second flange 410c is joined to the crossbeam side wall 202.

The inner-connection-plate second edge extends outward to form an inner-connection-plate second joining side 410d extending in a longitudinal direction. The inner-connection-plate second joining side 410d is joined to the longitudinal beam bottom wall 103.

An upper edge of the first inner connection side wall 412 folds outward to form a first-inner-connection-side-wall flange 410e extending approximately in a transverse direction. The first-inner-connection-side-wall flange 410e is joined to a groove wall of the groove structure of the front compartment crossbeam 220.

The inner connection plate may further be provided with a reinforcing structure by welding sheet metal or the like to further enhance the strength of the rear section of the front longitudinal beam 100 and prevent the rear section of the front longitudinal beam 100 from entering the dash panel due to bending during a collision.

Figure 12:
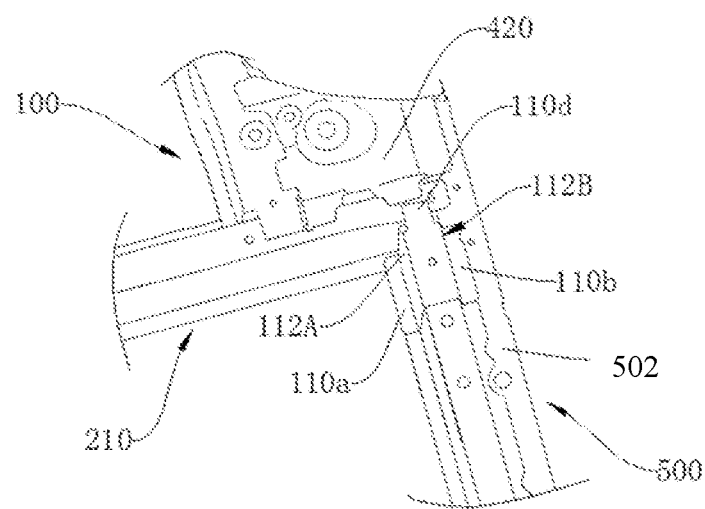
FIG. 12 is a detailed diagram of a connection relationship between a front crossbeam, a floor longitudinal beam, and the sill inner plate in FIG. 11.
Figure 13:
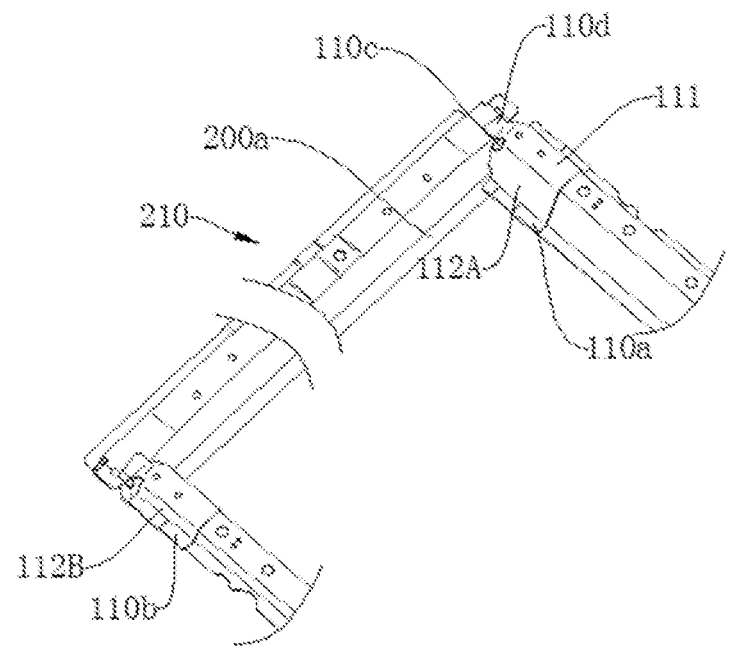
FIG. 13 is a detailed diagram of a connection relationship between a front crossbeam and a floor longitudinal beam in FIG. 11.

FIG. 11 and FIG. 12 show joining relationships between the outer connection plate 420 and the front longitudinal beam 100 and the front crossbeam 210. The outer connection plate 420 further extends outward and is joined to the sill inner plate 500. During a collision of the vehicle with a small offset, that is, a crash occurs on an outer side of the front longitudinal beam 100 of the vehicle, the front longitudinal beam 100 bears a relatively small force and produces a relatively poor effect of collapse and energy absorption. In this case, the outer connection plate 420 is configured to withstand the crash and transfer a collision force to the front crossbeam 210 and the sill inner plate 500, thereby reducing deformation of the A pillar and the dash panel 320 of the vehicle when they are compressed backward by a wheel. During a collision right in the front, when the front longitudinal beam bears a relatively large force, the outer connection plate 420 can be used to distribute a transferred force.

Figure 19:
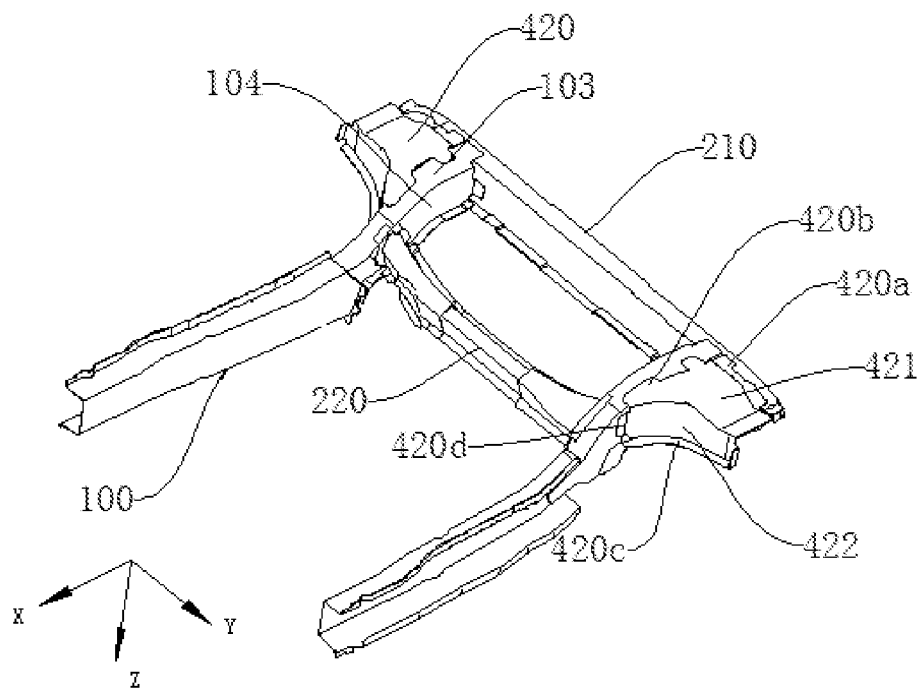
FIG. 19 shows another embodiment of the first implementation of the force transfer structure in the vehicle body structure according to the present disclosure, where an outer connection plate is shown.

Specifically, referring to FIG. 19, the outer connection plate 420 may include an outer connection bottom wall 421. The outer connection bottom wall 421 is formed to be rectangular, and is provided with an outer-connection-plate first edge, an outer-connection-plate second edge, an outer-connection-plate third edge, and an outer-connection-plate fourth edge that are sequentially connected end to end. The outer-connection-plate first edge extends along the front crossbeam 210 and is joined to the front crossbeam 210. The outer-connection-plate second edge extends along the front longitudinal beam 100 and is joined to the front longitudinal beam 100. The outer-connection-plate third edge is connected to an outer connection side wall 422 extending upward. The outer connection side wall 422 is joined to the front crossbeam 100.

Specifically, the outer-connection-plate first edge extends outward to form an outer-connection-plate first joining side 420a extending in a transverse direction. The outer-connection-plate first joining side 420a is joined to the crossbeam bottom wall 201. The outer-connection-plate second edge folds outward to form an outer-connection-plate second joining side 420b extending in a longitudinal direction. An upper edge of the outer connection side wall 422 folds outward to form an outer-connection-side-wall first flange 420c. An end portion, near the outer-connection-plate second edge, of the outer connection side wall 422 folds outward to form an outer-connection-side-wall second flange 420d extending in a vertical direction. The outer-connection-plate second joining side 420b is joined to the longitudinal beam bottom wall 103. The outer-connection-side-wall first flange 420c is joined to the first longitudinal beam flange 100a. The outer-connection-side-wall second flange 420d is joined to the longitudinal beam side wall 104. The outer-connection-side-wall first flange 420c is further joined to the dash panel 320.

The outer-connection-plate fourth edge extends along the sill inner plate 500 and is joined to the sill inner plate 500. An end portion, near the fourth edge, of the outer connection side wall 422 extends outward to be joined to the end portion of the sill inner plate 500.

In this implementation, the length of the outer-connection-plate second edge is greater than that of the outer-connection-plate fourth edge. The outer-connection-plate third edge is formed as a backward concave arc structure to avoid a wheel.

To improve the strength of the outer connection plate 420, especially, to deal with the foregoing case of a collision with a small offset, the outer connection plate 420 is further provided with a reinforcing structure configured to withstand a force in a longitudinal direction. Specifically, the reinforcing structure may be formed as a reinforcing rib extending from the outer-connection-plate first edge toward the outer-connection-plate third edge. A projection of the wheel on the outer connection plate 420 in a longitudinal direction is at least partially overlapped with an end portion of the reinforcing rib, to withstand impact from the wheel. The reinforcing structure may be alternatively formed to be sheet metal or a filled CBS (a composite reinforcement material).

Figure 20:
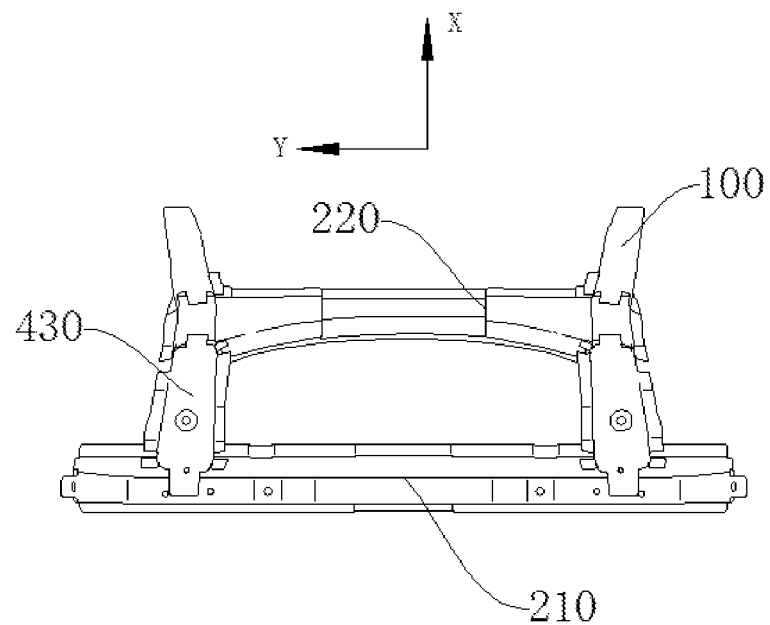
FIG. 20 shows a first embodiment of a second implementation of the force transfer structure in the vehicle body structure according to the present disclosure.
Figure 24:
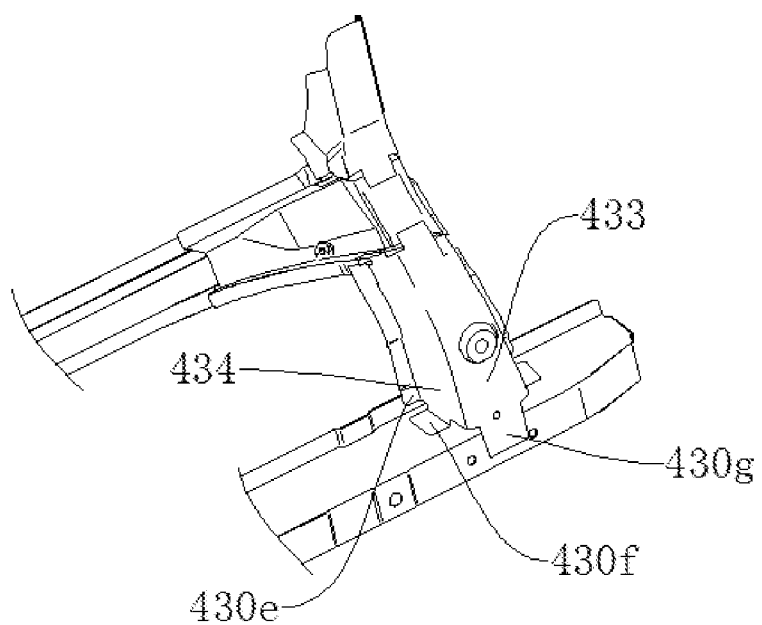
FIG. 24 is a detailed diagram of a connection relationship between a connection plate and a front crossbeam in FIG. 20.

As shown in FIG. 20 and FIG. 24, a second implementation of the vehicle body structure distributing a collision force is provided. The front compartment crossbeam 220 is mounted on rear ends of the left front longitudinal beam and the right front longitudinal beam. That is, the front longitudinal beam 100 stops at the front compartment crossbeam 220. In addition, a force transfer structure is connected between the front compartment crossbeam 220 and the front crossbeam 210, to transfer a collision force from the front longitudinal beam 100 to the carrying frame 700 through the force transfer structure. Specifically, the force transfer structure may be formed as a connection plate 430. A front end of the connection plate 430 is joined to the front compartment crossbeam 220, and a rear end of the connection plate 430 is joined to the front crossbeam 210, to transfer the collision force from the front compartment crossbeam 220 to the front crossbeam 210 through the connection plate 430. In addition, a top surface (namely, the highest surface) of the connection plate 430 may be alternatively connected to the floor panel 300, to improve the connection strength of the force transfer structure.

To facilitate respective joining to the front longitudinal beam 100 and the connection plate 430, two ends of the front compartment crossbeam 220 are provided with connection portions that are respectively joined to the front longitudinal beam 100 and the connection plate 430. For specific structures of the connection portions and connection relationships between the connection portions and the front longitudinal beam 100 and the connection plate 430, any appropriate design method may be selected according to an actual requirement.

In this implementation, the connection portion is formed as a groove structure with an upward opening and includes a connection bottom wall 221 and a front side wall 222 and a rear side wall 223 that are disposed opposite to each other in a longitudinal direction. An upper edge at the opening of the groove structure of the connection portion folds outward to separately form a front-side-wall flange 222a and a rear-side-wall flange 223a that extend in a transverse direction. The rear end of the front longitudinal beam 100 is separately joined to the front side wall 222, the front-side-wall flange 222a, and the connection bottom wall 221. The connection plate 430 is separately joined to the rear side wall 223, the rear-side-wall flange 223a, and the connection bottom wall 221.

Figure 21:
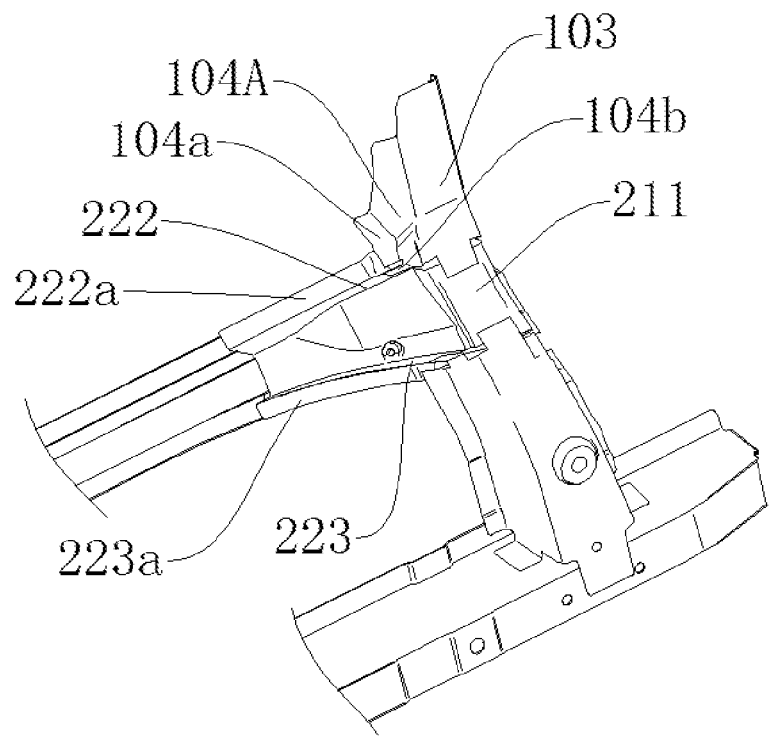
FIG. 21 is a detailed diagram of a connection relationship between a front longitudinal beam and a front compartment crossbeam in FIG. 20.
Figure 22:
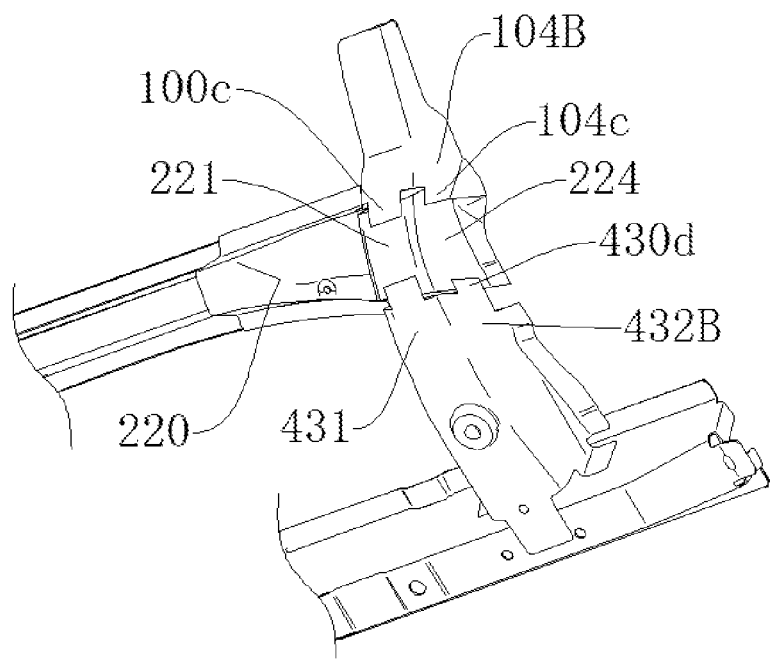
FIG. 22 is a detailed diagram from another perspective of a connection relationship between the front longitudinal beam and the front compartment crossbeam in FIG. 20.

Correspondingly, referring to FIG. 21 and FIG. 22, the rear end of the front longitudinal beam 100 is formed as a groove structure with an upward opening and includes a longitudinal beam inner side wall 104A, the longitudinal beam bottom wall 103, and a longitudinal beam outer side wall 104B. An upper edge of the longitudinal beam inner side wall 104A folds outward to form a first longitudinal-beam-inner-side-wall flange 104a extending in a longitudinal direction. An end portion of the longitudinal beam inner side wall 104A folds outward to form a second longitudinal-beam-inner-side-wall flange 104b extending in a vertical direction. An end portion of the first longitudinal beam bottom wall 103 extends outward to form a longitudinal-beam-bottom-wall joining side 100c extending in a transverse direction. An end portion of the longitudinal beam outer side wall 104B extends outward to form a longitudinal-beam-outer-side-wall joining side 104c. The first longitudinal-beam-inner-side-wall flange 104a is joined to the front-side-wall flange 222a, the second longitudinal-beaminner-side-wall flange 104b is joined to the front side wall 222, and the longitudinal-beam-bottom-wall joining side 100c and the longitudinal-beam-outer-side-wall joining side 104c are separately joined to the connection bottom wall 221. Specifically, to facilitate joining to the front longitudinal beam 100, an end portion of the connection bottom wall 221 may fold upward to form an outer end wall 224 extending in a longitudinal direction. The outer end wall 224 is connected between the front side wall 222 and the rear side wall 223. The longitudinal-beam-outer-side-wall joining side 104c is joined to the outer end wall 224 (referring to FIG. 22).

Figure 23:
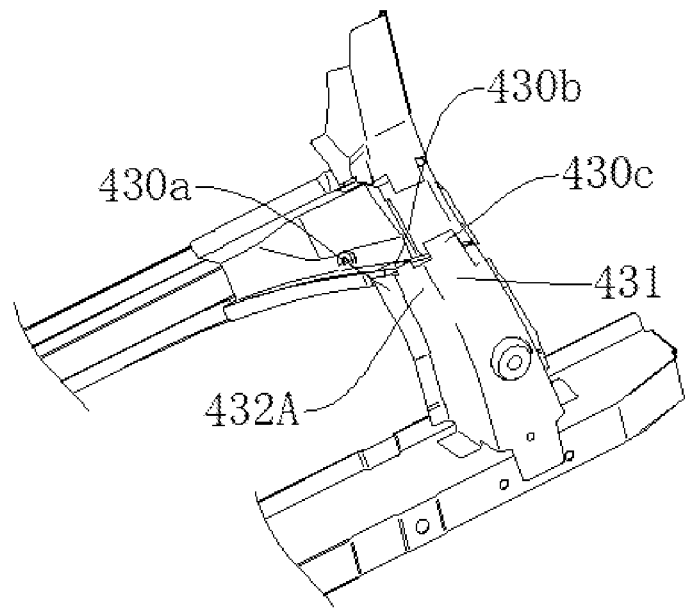
FIG. 23 is a detailed diagram of a connection relationship between a connection plate and the front compartment crossbeam in FIG. 20.

Referring to FIG. 22 and FIG. 23, a front end of the connection plate 430 is formed as a groove structure with an upward opening, and includes a first inner side wall 432A, a first bottom wall 431, and a first outer side wall 432B. An upper edge of the first inner side wall 432A folds outward to form a first-inner-side-wall first flange 430a extending in a longitudinal direction. An end portion of the inner side wall 432A folds outward to form a first-inner-side-wall second flange 430b extending in a vertical direction. An end portion of the first bottom wall 431 extends outward to form a first-bottom-wall joining side 430c extending in a transverse direction. An end portion of the first outer side wall 432B extends outward to form a first-outer-side-wall joining side 430d. The first-inner-side-wall first flange 430a is joined to the rear-side-wall flange 223a, the first-inner-side-wall second flange 430b is joined to the rear side wall 223, and the first-bottom-wall joining side 430c and the first-outer-side-wall joining side 430d are separately joined to the connection bottom wall 221. Specifically, to facilitate joining to the connection plate 430, an end portion of the connection bottom wall 221 may fold upward to form an outer end wall 224 extending in a longitudinal direction. The outer end wall 224 is connected between the front side wall 222 and the rear side wall 223. The first-outer-side-wall joining side is joined to the outer end wall 224 (referring to FIG. 22).

As shown in FIG. 24, a rear end of the connection plate 430 is separately joined to the crossbeam bottom wall 201, the crossbeam side wall 202, and the crossbeam opening flange 200a. The rear end of the connection plate 430 is formed as a groove structure with an upward opening, and includes a second bottom wall 433 and two second side walls 434 that are disposed opposite to each other. An upper edge at the opening of the groove structure in the rear end of the connection plate 430 folds outward to form a second-side-wall first flange 430e extending in a longitudinal direction. An end portion of the second side wall 434 folds outward to form a second-side-wall second flange 430f extending in a vertical direction. An end portion of the second bottom wall 433 extends outward to form a second-bottom-wall joining side 430g extending in a transverse direction. The second-side-wall first flange 430e is joined to the crossbeam opening flange 200a. The second-side-wall second flange 430f is joined to the crossbeam side wall 202. The second-bottom-wall joining side 430g is joined to the crossbeam bottom wall 201.

The quantity of connection plates 430 between the front compartment crossbeam 220 and the front crossbeam 210 may be randomly set. For example, in the implementation shown in FIG. 19 to FIG. 23, the force transfer structure between the front compartment crossbeam 220 and the front crossbeam 210 includes a plurality of connection plates 430. There are two connection plates 430, and the connection plates are symmetrically provided with respect to the perpendicular bisector of the front crossbeam 210.

Figure 25:
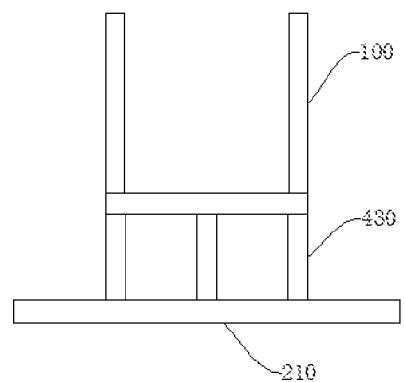
FIG. 25 shows a second embodiment of the second implementation of the force transfer structure in the vehicle body structure according to the present disclosure.

Optionally, referring to FIG. 25, there are three connection plates 430, where the connection plate 430 in the middle is located on the perpendicular bisector of the front crossbeam 210, and the connection plates 430 on the left side and the right side are symmetrically provided with respect to the connection plate 430 in the middle.

Figure 26:
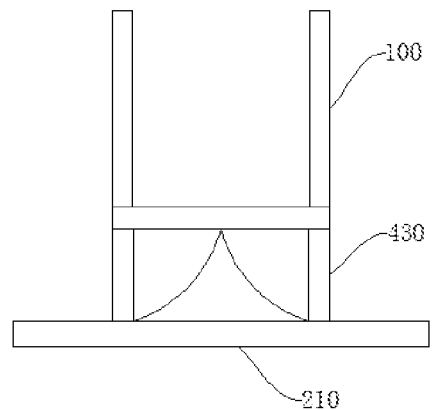
FIG. 26 shows a third embodiment of the second implementation of the force transfer structure in the vehicle body structure according to the present disclosure.
Figure 27:
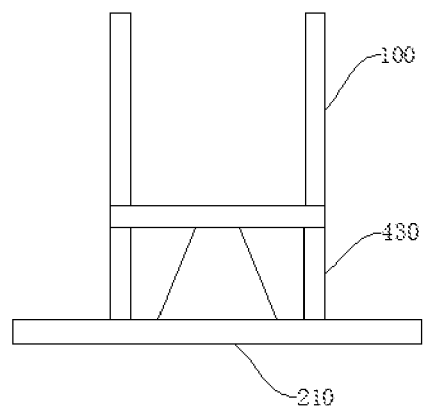
FIG. 27 shows a fourth embodiment of the second implementation of the force transfer structure in the vehicle body structure according to the present disclosure.
Figure 28:
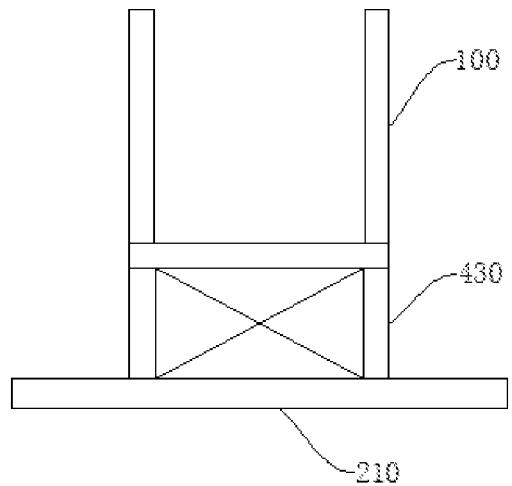
FIG. 28 shows a fifth embodiment of the second implementation of the force transfer structure in the vehicle body structure according to the present disclosure.

Alternatively, referring to FIG. 26 and FIG. 28, there are two connection plates 430, and the two connection plates 430 are symmetrically provided with respect to the perpendicular bisector of the front crossbeam 210, and a λ-shaped (shown in FIG. 26), a "/ \"-shaped (shown in FIG. 27) or an X-shaped (shown in FIG. 28) connection beam is disposed between the two connection plates 430. A front end of the λ-shaped or the "/ \"-shaped or the X-shaped connection beam is connected to the front compartment crossbeam 220, and a rear end of the connection beam is connected to the front crossbeam 210.

To ensure that the connection plate 430 has sufficient strength, in the implementations of the present disclosure, a continuous groove structure is formed between the front end and the rear end of the connection plate 430. In another alternative implementation, for example, when the connection plate 430 has sufficient strength, the front end and the rear end of the connection plate 430 may be a groove structure formed at the two ends of the connection plate 430 at an interval, to facilitate the machining of a flange and joining to another vehicle body beam or sill inner plate.

In this technical solution, impact energy of a front collision is transferred to the connection plate 430 through the front compartment crossbeam 220, and is continuously distributed to the front crossbeam 210 and other beams of the carrying frame 700, thereby improving collision safety performance of the vehicle.

Figure 29:
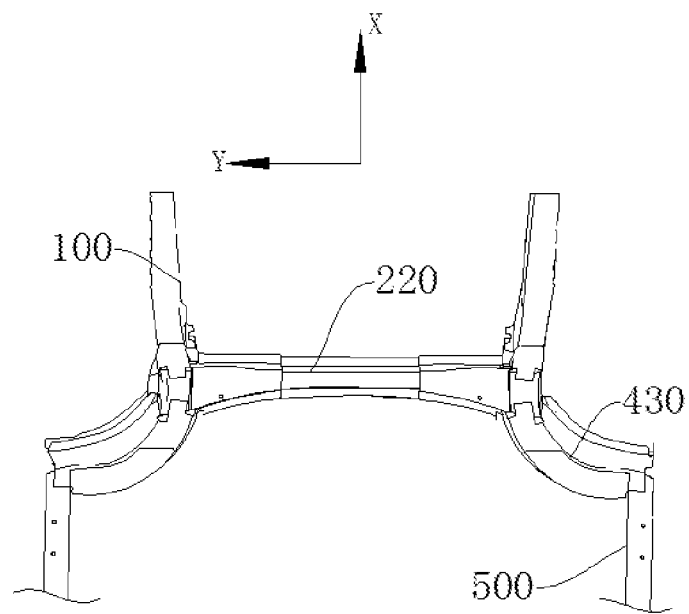
FIG. 29 is a schematic diagram of a third implementation of the force transfer structure in the vehicle body structure according to the present disclosure.
Figure 30:
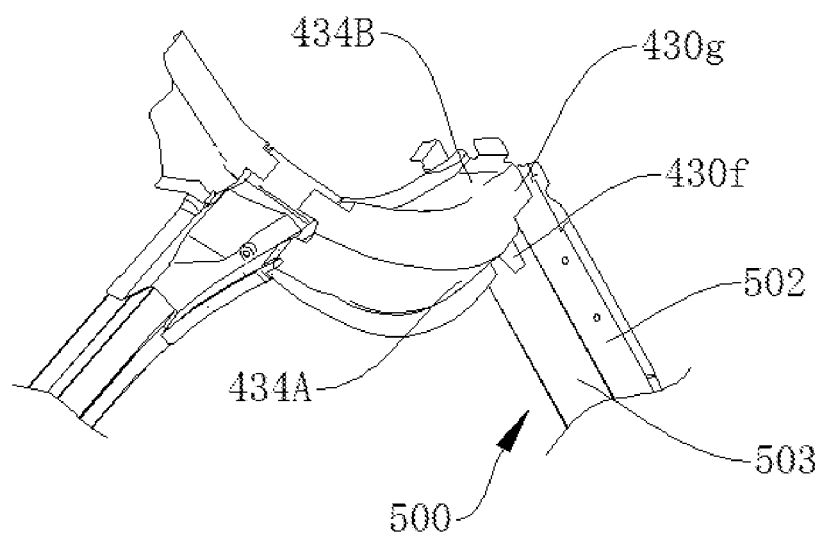
FIG. 30 is a detailed diagram of a connection relationship between a connection plate and a sill inner plate in FIG. 29.

As shown in FIG. 29 and FIG. 30, a third implementation of the vehicle body structure distributing a collision force is provided. The front longitudinal beam 100 stops at the front compartment crossbeam 220, and a reinforcing structure is connected between the front compartment crossbeam 220 and the sill inner plate 500. In this implementation, connection manners between the front compartment crossbeam 220 and the front longitudinal beam 100 and the front end of the connection plate 430 are the same as those in the second implementation. Refer to FIG. 20 and FIG. 23 for details, which are not described herein again. To adapt to the design of the overall structure of the vehicle, the connection plate 430 bends outward from the front compartment crossbeam 220 to enable the rear end of the connection plate 430 to be joined to an inner plate bottom wall 502 and an inner plate side wall 503 of the sill inner plate 500, and a top surface of the connection plate 430 is also connected below the floor panel 300. Specifically, the connection plate 430 bends outward from the front compartment crossbeam 220 and is connected to the sill inner plate 500. Moreover, the connection plate 430 is a π-shaped structure with an upward opening, and a top surface of the π-shaped structure is connected to a lower surface of the floor panel 300.

As shown in FIG. 30, a rear end of the connection plate 430 is formed as a groove structure with an upward opening, including a second inner side wall 434A, a second bottom wall 433, and a second outer side wall 434B. An end portion of the second inner side wall 434A folds outward to form a second-inner-side-wall flange 430f extending in a vertical direction. An end portion of the second bottom wall 433 extends outward to form a second-bottom-wall joining side 430g extending in a longitudinal direction. The second-inner-side-wall flange 430f is joined to the inner plate side wall 503. The second-bottom-wall joining side 430g is joined to the inner plate bottom wall 502. An end portion of the second outer side wall 434B extends outward to be joined to the end portion of the sill inner plate 500. The front crossbeam 210 and the sill inner plate 500 are connected behind a reinforcing plate 430, to support the sill inner plate 500 and distribute the transferred force.

In this implementation, the front end of the connection plate 430 transits to the rear end of the connection plate in an arc form, to avoid the wheel.

Figure 31:
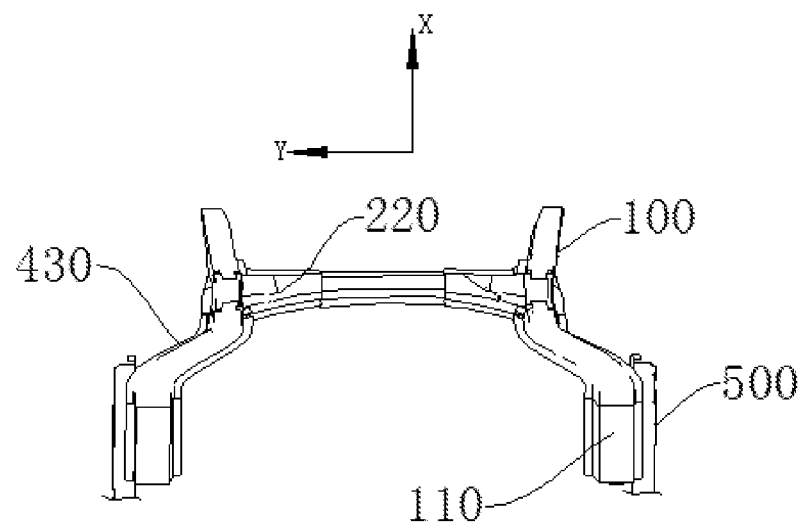
FIG. 31 is a schematic diagram of a fourth implementation of the force transfer structure in the vehicle body structure according to the present disclosure.
Figure 32:
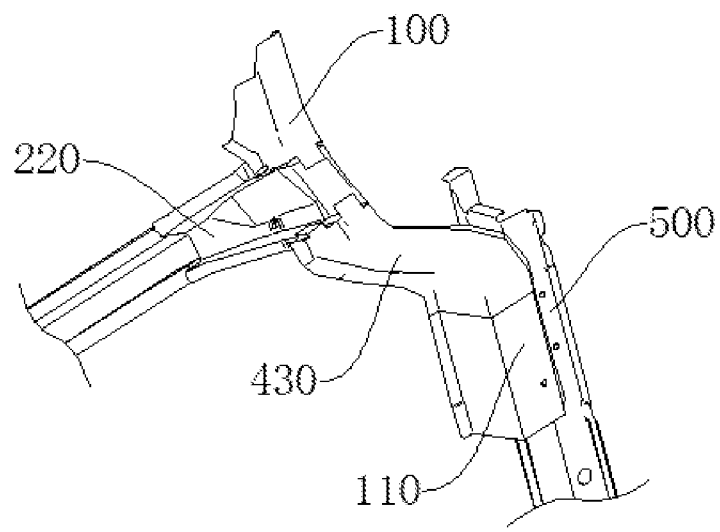
FIG. 32 is a detailed diagram of a connection relationship between a connection plate and a floor longitudinal beam in FIG. 31.

As shown in FIG. 31 and FIG. 32, a fourth implementation of the vehicle body structure distributing a collision force is provided. The front longitudinal beam 100 stops at the front compartment crossbeam 220, and a force transfer structure is connected between the front compartment crossbeam 220 and the floor longitudinal beam 110. In this implementation, connection manners between the front compartment crossbeam 220 and the front longitudinal beam 100 and the front end of the connection plate 430 are the same as those in the second implementation. Refer to the connection manners in FIG. 20 and FIG. 23 for details, which are not described herein again. The connection plate 430 bends outward from the front compartment crossbeam 220 and the rear end of the connection plate 430 is connected to the floor longitudinal beam 110. Specifically, the connection plate 430 is a π-shaped structure with an upward opening, and a top surface of the π-shaped structure is connected to the lower surface of the floor panel 300. In addition, the rear end of the connection plate 430 is formed as a groove structure with an upward opening. An inner wall contour of the groove structure in the rear end is the same as an outer wall contour of an end portion of the floor longitudinal beam 110, and the two contours are sleeved together. Alternatively, an outer wall contour of the groove structure in the rear end of the connection plate 430 may be the same as an inner wall contour of the end portion of the floor longitudinal beam 110, and the two contours are sleeved together.

The foregoing introduces several implementations in which a force transferred from the front longitudinal beam 100 is mainly transferred and distributed below the floor panel 300. The following introduces, but is not limited to, related implementations in which the force is mainly transferred and distributed above the floor panel 300.

Based on the foregoing technical solution, an upper surface of the floor panel 300 is further fastened with a cross press plate 310 having a same extending direction as the front crossbeam 210, and projections of the cross press plate 310 and the front crossbeam 210 on the floor panel 300 in a vertical direction are at least partially overlapped. Therefore, during a collision (including a front collision and a side collision) of the vehicle, the cross press plate 310 can stop upward deformation of the front crossbeam 210, so that a problem that deformation of the front crossbeam 210 is excessively large to make the floor panel 300 protrude upward to compress an inner space of the occupant compartment and hinder escape of occupants can be avoided.

Figure 33:
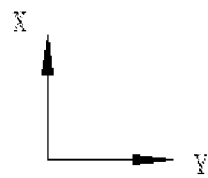
FIG. 33 is a schematic structural diagram of an upper surface of a floor panel in the vehicle body structure according to the present disclosure, where a cross press plate and a central channel cover plate are shown.
Figure 33:
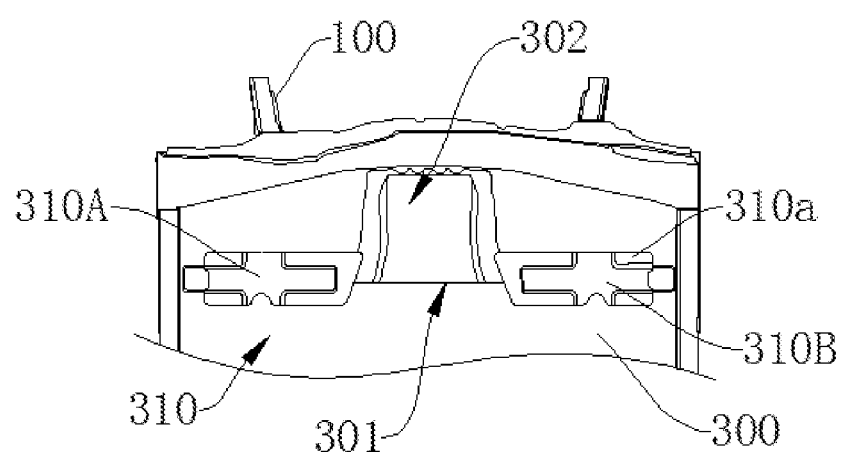
Figure 34:
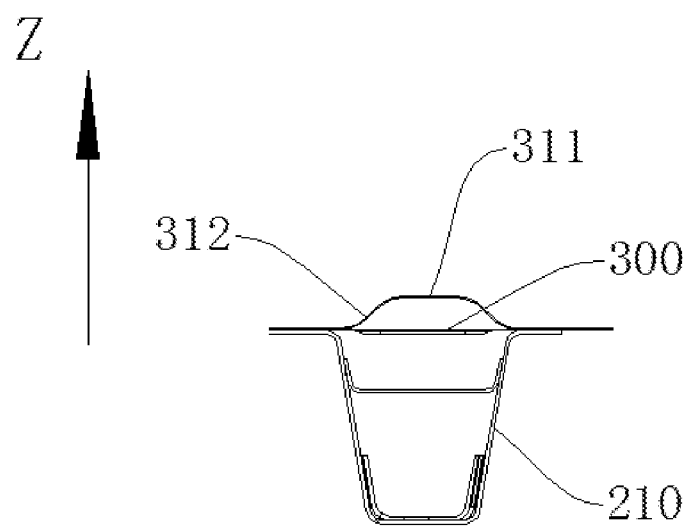
FIG. 34 is a schematic diagram of a positional relationship between the cross press plate, the floor panel, and a front crossbeam in FIG. 33.

Specifically, as shown in FIG. 33 and FIG. 34, the cross press plate 310 is formed as a second groove structure with a downward opening and includes a cross-press-plate bottom wall 311 and a cross-press-plate side wall 312. A lower edge at the opening of the second groove structure folds outward to form a cross-press-plate flange 310A. The cross press plate 310 is connected to the floor panel 300 by the cross-press-plate flange 310A, and the crossbeam opening flange 200a is aligned with the cross-press-plate flange 310A, so that the front crossbeam 210 and the cross press plate 310 together form a rectangular supporting structure. Therefore, the front crossbeam 210, the floor panel 300, and the cross press plate 310 together form a plurality of rectangular supporting structures. Specifically, the crossbeam opening flange 200a, the floor panel 300, and the cross-press-plate flange 310A may be welded together in a three-layer welding manner, to ensure the strength of a connection position between the crossbeam opening flange 200a, the floor panel 300, and the cross-press-plate flange 310a. In this way, a phenomenon that the front crossbeam 210 is deformed to drive the floor panel 300 to enter the occupant compartment can be effectively reduced. In addition, when a force of the front collision is relatively large to enable the floor panel 300 located in front of the front crossbeam 210 to fold upward, a clamping structure formed by the front crossbeam 210 and the cross press plate 310 can stop the tendency of continuous folding of the floor panel 300, thereby reducing a risk of the deformed floor panel 300 from injuring an occupant.

In the vehicle body structure provided in the present disclosure, for convenience of arranging a cable or a pipeline, for example, in an electric vehicle, to arrange a cooling water pipe or to implement electrical connection between a battery pack and an electrical control element in the front of the vehicle, a gap used for at least one of the cable and the pipeline to pass through is provided between a middle section of the front crossbeam 210 and the floor panel 300. The gap may be provided by using various methods. For example, as shown in FIG. 34, a middle portion of the floor panel 300 protrudes upward to form a central channel 301 extending in a longitudinal direction, and the front crossbeam 210 crosses the central channel 301 from one end of the floor panel 300 in a transverse direction to extend to the other end of the floor panel 300, so that the front crossbeam 210 and the central channel 301 jointly define the gap. The height of the gap is less than or equal to 60 mm, and further, is less than or equal to 50 mm, so that a space inside the vehicle is appropriately used.

Figure 35:
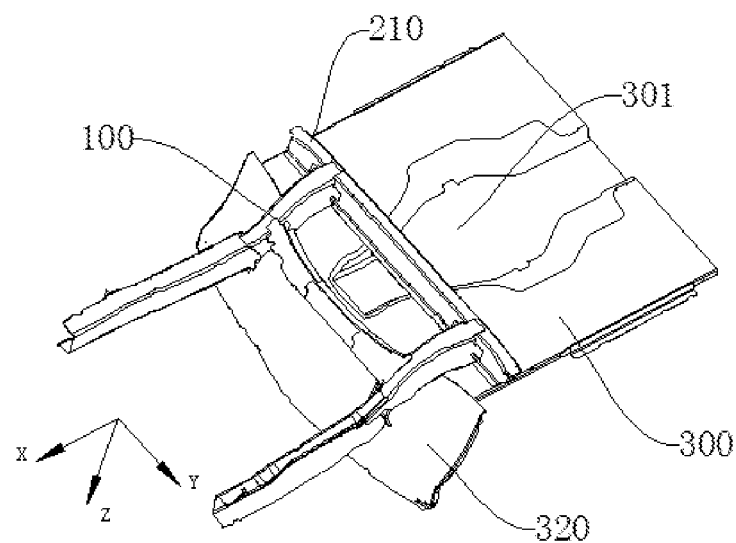
FIG. 35 is a perspective bottom view of the floor panel in the vehicle body structure according to the present disclosure, where a gap is formed between a central channel and the front crossbeam.
Figure 36:
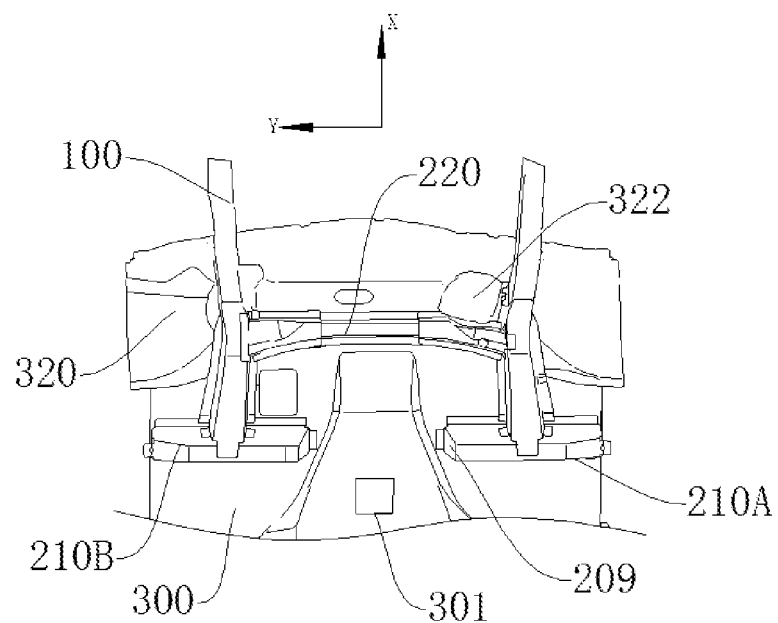
FIG. 36 is a schematic diagram of a deformation manner of the gap in FIG. 35.

In an alternative implementation, the gap may be formed by the central channel 301, and the front crossbeam 210 may include a first front crossbeam 210A and a second front crossbeam 210B that are disposed on two sides of the central channel 301 in a transverse direction at an interval. Referring to FIG. 35, the first front crossbeam 210A and the second front crossbeam 210B are both formed as groove structures with an upward opening, and include a crossbeam bottom wall 201, a crossbeam side wall 202, and a crossbeam inner end wall 209 connected between the crossbeam bottom wall 201 and the crossbeam side wall 202. In addition, an upper edge at the opening of the groove structure folds outward to form a crossbeam opening flange 200a, and the front crossbeam 210 is connected to the floor panel 300 by the crossbeam opening flange 200a. Specifically, the left front longitudinal beam and the right front longitudinal beam may have any appropriate connection position. For example, the left front longitudinal beam is connected to a central position of the first front crossbeam 210A in a transverse direction, and the right front longitudinal beam is connected to a central position of the second front crossbeam 210B in a transverse direction, so that the corresponding front crossbeam 210 can adequately withstand a collision force transferred by the left front longitudinal beam and the right front longitudinal beam.

To further strengthen a corresponding connection structure between the front crossbeam 210 and the front longitudinal beam 100, an inner side of the front longitudinal beam 100 is provided with an inner connection plate 410, and an outer side is provided with an outer connection plate

420. The front side of the inner connection plate 410 is connected to the front compartment crossbeam 220, the rear side is connected to the front crossbeam 210, and an outer side is connected to the front longitudinal beam 100. An inner side of the outer connection plate 420 is connected to the front longitudinal beam 100, and the rear side is connected to the front crossbeam 210.

In the implementations provided in the present disclosure, as shown in FIG. 32, to adapt to a structure of the central channel 301, the cross press plate 310 is formed as a first cross press plate 310A and a second cross press plate 310B that are respectively located on two sides of the central channel 301. The central channel 301 is further provided with a central channel cover plate 302 to strengthen the structure of the central channel 301, to prevent the central channel 301 from being deformed during a collision, thereby protecting the occupants and the cable arranged below the floor panel 300.

Figure 37:
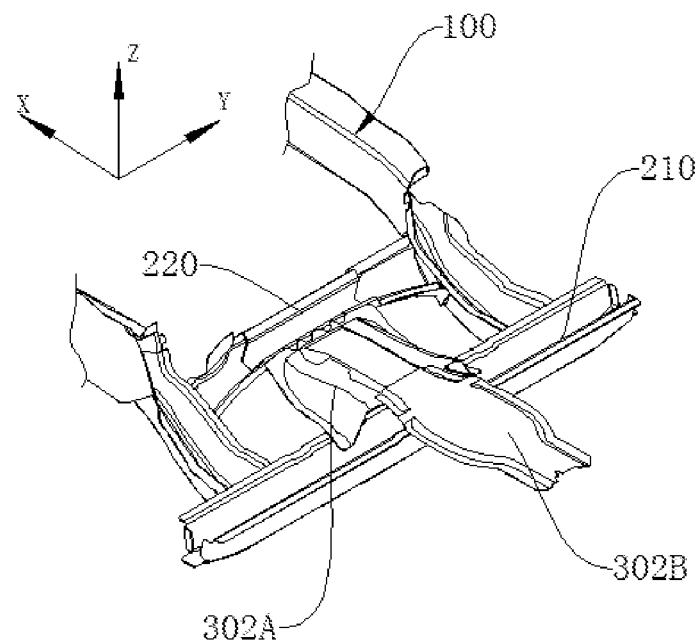
FIG. 37 is a schematic diagram of a connection relationship between the central channel cover plate and the front compartment crossbeam in the vehicle body structure according to the present disclosure.
Figure 38:
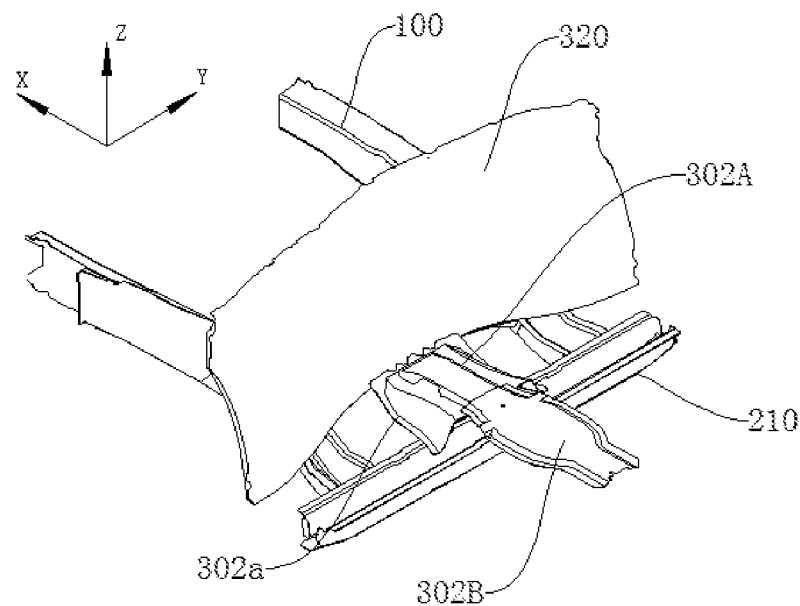
FIG. 38 is a schematic diagram of a connection relationship between the central channel cover plate and the dash panel in the vehicle body structure according to the present disclosure.

To further optimize an overall force transfer path of the vehicle body structure, as shown in FIG. 35, FIG. 37, and FIG. 38, the front compartment crossbeam 220 is connected to a front surface of the dash panel 320 and is overlapped with a front end of the floor panel 300. The central channel cover plate 302 includes a front section channel cover plate 302A. A front end of the front section channel cover plate 302A is connected to the front end of the floor panel 300 and is overlapped with a position of the front compartment crossbeam 220. A rear end of the front section channel cover plate 302A extends backward in the extending direction of the central channel 301 to be aligned with the front crossbeam 210. The front crossbeam 210 is mounted near the dash panel 320 on a lower surface of the floor panel 300. Therefore, the energy of a front collision of the vehicle can be transferred to the front crossbeam 210 through the front longitudinal beam 100 and be distributed to other components of the carrying frame 700, and can also be transferred to the central channel cover plate 302 and the floor panel 300 through the front compartment crossbeam 220, thereby minimizing the compression and deformation of the dash panel 320 caused by a collision, so as to protect occupants in the occupant compartment.

Specifically, a protrusion height of the central channel 301 gradually increases from a front end of the floor panel 300 to a middle portion of the floor panel 300, and the protrusion height is less than or equal to 60 mm, and further, is less than or equal to 50 mm, so that a space inside the vehicle is appropriately used. In some implementations, an upper surface of the floor panel 300 is provided with the cross press plate 310 and a longitudinal press plate 330 configured to suppress the floor panel 300 from folding upward. Optionally, the central channel 301 may have a relatively low height to be flush with upper surfaces of the cross press plate 310 and the longitudinal press plate 330, to ensure that the floor panel 300 has a relatively flat top surface, thereby facilitating arrangement of components inside the vehicle and improving the appearance inside the vehicle and ride comfort. The front section channel cover plate 302A is formed to fit an outer contour of the central channel 301 and at least partially covers the groove structure of the central channel 301. In this technical solution, the front section channel cover plate 302A covers a front end of the central channel 301, so that the central channel 301 can withstand relatively large impact at the instant of a collision.

The front section channel cover plate 302A can be fastened on the floor panel 300 in any appropriate manner. For example, a lower edge at an opening of a groove structure of the front section channel cover plate 302A folds outward to form a front-section-channel-cover-plate flange 302A. The front section channel cover plate 302A is connected to the floor panel 300 by the front-section-channel-cover-plate flange 302A. In addition, inner ends of the first cross press plate 310A and the second cross press plate 310B may further be joined to the front section channel cover plate 302A, to improve the connection strength between components on the upper surface of the floor panel 300 and the floor panel 300. Outer ends of the first cross press plate 310A and the second cross press plate 310B may extend outward to be joined to the sill inner plate 500, to strengthen the overall structure of the vehicle body structure and help distribute collision energy.

Figure 39:
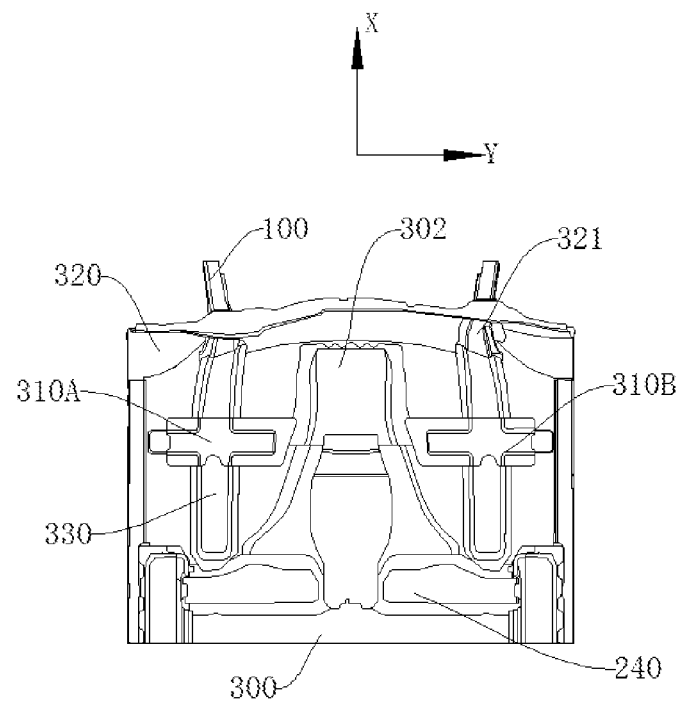
FIG. 39 is another schematic structural diagram of the upper surface of the floor panel in the vehicle body structure according to the present disclosure.

Further, the central channel cover plate 302 further includes a rear section channel cover plate 302B connected to a rear end of the front section channel cover plate 302A. The rear section channel cover plate 302B extends backward from the front section channel cover plate 302A along a top wall of the central channel 301, for example, extends to be joined to a front seat mounting crossbeam 240. As shown in FIG. 39, a collision force transfer path of the vehicle body structure is extended.

Figure 40:
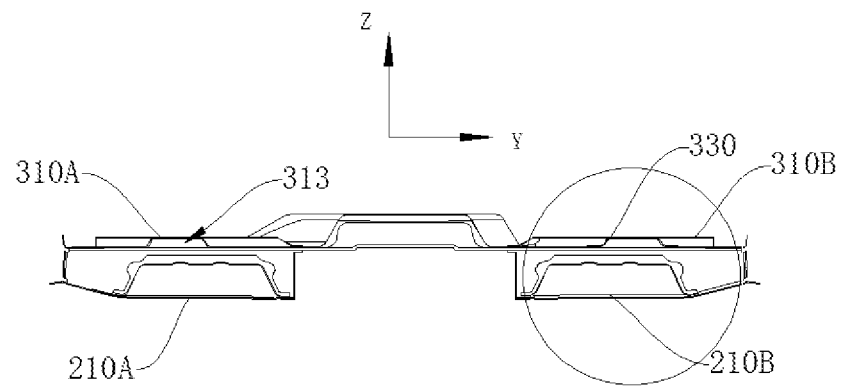
FIG. 40 is a schematic diagram of a positional relationship between a cross press plate, a longitudinal press plate, the floor panel, and a front crossbeam in FIG. 39.

In the present disclosure, the vehicle body structure may further include the longitudinal press plate 330 fastened above the floor panel 300. Referring to FIG. 39 and FIG. 40, there may be two longitudinal press plates 330 respectively corresponding to the left front longitudinal beam and the right front longitudinal beam. The two longitudinal press plates 330 respectively intersect with the first cross press plate 310A and the second cross press plate 310B, and projections of the longitudinal press plate 330 and the front longitudinal beam 100 on the floor panel 300 in a vertical direction are at least partially overlapped. Therefore, during a front collision of the vehicle, the longitudinal press plate 330 can stop upward deformation of the front longitudinal beam 100, and prevent the front longitudinal beam 100 from bending upward to make the floor panel 300 fold upward, thereby protecting the legs of occupants.

Figure 41:
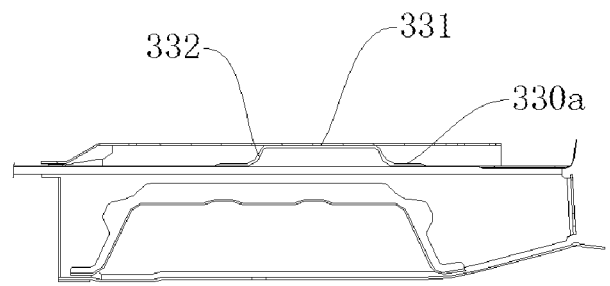
FIG. 41 is an enlarged view of details in FIG. 40.

There may be a plurality of implementations in which the cross press plate 310 and the longitudinal press plate 330 intersect with each other. In a possible implementation, as shown in FIG. 39 to FIG. 41, the cross-press-plate side wall 312 of the groove structure of the cross press plate 310 is formed with an avoidance slot 313 with a downward opening. The avoidance slot 313 runs through the cross-press-plate side wall 312, and the longitudinal press plate 330 passes through the avoidance slot 313 to intersect with the cross press plate 310. Further, the depth of the avoidance slot 313 is the same as that of the groove structure of the cross press plate 310, so that an upper surface of the longitudinal press plate 330 is joined to a lower surface of the cross press plate 311, to ensure that there is sufficient connection strength between the cross press plate 310 and the longitudinal press plate 330, and to achieve an effect that an upper surface of the cross press plate is a flat surface. In an alternative implementation, the cross press plate 310 and the longitudinal press plate 330 may further be an integrally formed cross-shaped plate structure.

Figure 42:
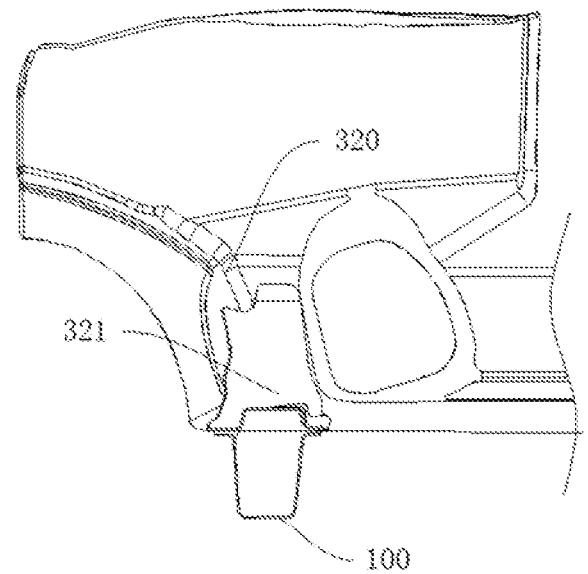
FIG. 42 is a schematic diagram of a positional relationship between a connection plate of the longitudinal press plate and a front longitudinal beam in FIG. 39.
Figure 43:
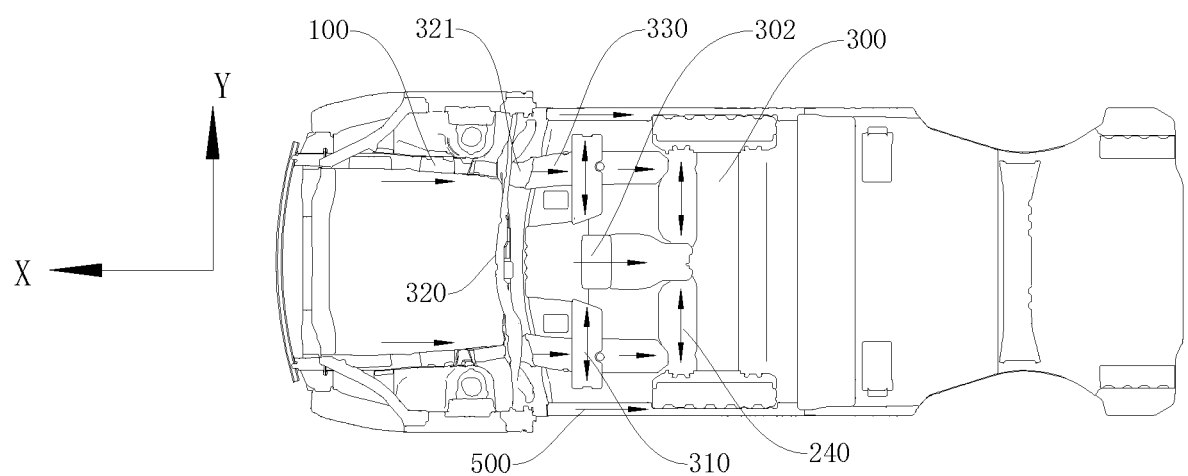
FIG. 43 is a top view of an implementation of a vehicle body structure according to the present disclosure.

Optionally, a longitudinal-press-plate connection plate 321 is connected to a rear surface of the dash panel 320. Referring to FIG. 39 and FIG. 42, the longitudinal press plate 330 is connected to the front longitudinal beam 100 by the longitudinal-press-plate connection plate 321, to extend a force transfer path of the vehicle body structure. During a front collision, a collision force applied to the front longitudinal beam 100 may be alternatively transferred to the longitudinal press plate 330 through the longitudinal-pressplate connection plate 321. Further, after intersecting with the cross press plate 310, the longitudinal press plate 330 may continue to extend backward to be joined to a seat crossbeam. The seat crossbeam may be the front seat mounting crossbeam 240 or the rear seat mounting crossbeam 260 that are disposed behind the front crossbeam 210 at an interval, so that the collision force may further be transferred to other components of the vehicle body structure, to improve the safety of the vehicle during a collision. In addition, the cross press plate and the longitudinal press plate further strengthen the floor panel.

Specifically, the front longitudinal beam 100, the longitudinal-press-plate connection plate 321, and the longitudinal press plate 330 may be connected in any appropriate form. The front longitudinal beam 100 is provided with a groove structure with an upward opening. The longitudinal-press-plate connection plate 321 is provided with a groove structure with a downward opening (referring to FIG. 42), so that the front longitudinal beam 100 and the longitudinal-press-plate connection plate 321 can be combined and connected into a rectangular structure, to improve anti-impaction strength of a connection position. In addition, the longitudinal-press-plate connection plate 321, the dash panel 320, and the front longitudinal beam 100 may be integrally connected in a three-layer welding manner. A front end of the longitudinal press plate 330 is welded to a rear end of the longitudinal-press-plate connection plate 321.

In this implementation, as shown in FIG. 40 and FIG. 41, the longitudinal press plate 330 is formed as a groove structure with a downward opening and includes a longitudinal-press-plate bottom wall 331 and a longitudinal-press-plate side wall 332. A lower edge at the opening of the groove structure of the longitudinal press plate folds outward to form a longitudinal-press-plate flange 330a. The longitudinal-press-plate flange 330a is connected to the floor panel 300, to keep stable connection, and enable the groove structure of the longitudinal press plate 330 to be aligned with the first longitudinal beam flange 100a in the rear end of the front longitudinal beam 100 on the floor panel 300. Therefore, anti-bending strength of the rear end of the front longitudinal beam 100 is strengthened, and the front longitudinal beam 100 is prevented from being deformed to make the floor panel 300 to fold upward.

It should be noted that the vehicle body crossbeam 200 provided in the present disclosure can be used for all the crossbeams such as the front crossbeam 210 and the floor rear crossbeam 230 used in the vehicle body structure provided in the present disclosure. When the front crossbeam 210 and the floor rear crossbeam 230 are respectively used as a battery pack mounting front crossbeam and a battery pack mounting rear crossbeam, the first mounting hole 701a and the second mounting hole 701b of the vehicle body crossbeam 200 are formed as mounting holes of the battery tray 600 of the carrying frame 700.

FIG. 43 to FIG. 46 are overall views of a vehicle body structure according to the present disclosure. With reference to the accompanying drawings, it may be learned that in the vehicle body structure provided in the present disclosure, a plurality of force transfer paths for distributing a collision force can be formed during a front collision of a vehicle. Specifically, above the floor panel 300, the force transfer paths of a collision force include, but are not limited to: 1) the front longitudinal beam 100—the longitudinal-press-plate connection plate 321—the longitudinal press plate 330—the seat crossbeam; and 2) the front compartment crossbeam 220—the central channel cover plate 302—the central channel 301. In addition, the two force transfer paths are connected by the cross press plate 310, and the force is further distributed to the sill inner plate 500. Generally, in an occupant compartment, especially inside a driver compartment, occupants are located behind the dash panel 320 and on a side of the central channel 301. The force transfer structure can prevent the floor panel 300 and the dash panel 320 from being significantly deformed due to a collision, to reduce injury caused to the occupants by deformation of the floor panel 300 and the dash panel 320, and can also ensure that the transfer paths of a collision force avoid the occupants.

Below the floor panel 300, the force transfer paths of a collision force include: the front longitudinal beam 100—the front crossbeam 210—the floor longitudinal beam 110 and the sill inner plate 500—the rear longitudinal beam 120, and further include the front compartment crossbeam 220, the floor rear crossbeam 230, and the rear seat mounting crossbeam 260 that assist in distributing a collision force. At least two closed-loop frames are formed below the floor panel 300, and are as follows:

1) A closed-loop frame includes the front compartment crossbeam 220, the left front longitudinal beam, the front crossbeam 210, and the right front longitudinal beam. The closed-loop frame has at least the following advantages: First, the closed-loop frame withstands front collision load, including initial collision load transferred through a force transfer path and backward collision impact from a driving motor or the like. Second, the closed-loop frame structure has relatively high stability, and optionally, in actual manufacturing, an appropriate beam wall thickness and material strength can be set to better ensure that the entry and deformation of the dash panel in the front portion of the occupant compartment are suppressed. Third, the reinforcing structure that is formed by the frame structure and the outer connection plate 420 disposed on an outer side of the front longitudinal beam 100 can effectively adapt to collision conditions with a wheel having a severe backward deformation tendency, for example, collision with a small offset, to ensure that deformation of the A pillar and the sill inner plate 500 in the rear is suppressed. Fourth, the stabilization structure between the front compartment crossbeam 220 and the front crossbeam 210 can maximally distribute and transfer concentrated load applied by the front longitudinal beam (and a wheel during a collision with a small offset) to the sill inner plate 500 on two sides of the occupant compartment and the floor longitudinal beam 110, and then further transfer the load to the rear of the vehicle body. In this way, a force is normally applied, and the deformation of the occupant compartment during a front collision can be effectively prevented.

2) A closed-loop frame includes the carrying frame 700. The closed-loop frame has at least the following advantages: First, while satisfying collision safety deformation requirements, the closed-loop frame can maximize an arrangement area (space) for battery packs, to improve a performance requirement of a long range. Second, the closed-loop frame provides a simple and practical manner for assembling battery packs, and battery packs having intensive features in spatial arrangement facilitates electric heat management inside the battery packs. Third, a geometric position of the closed-loop frame and a geometric position of the occupant compartment, that is, a geometric position of the floor panel, are basically aligned, so that while anti-collision deformation of the frame structure or an occupant compartment structure is improved, occupants and battery packs are protected. Fourth, it is relatively easy to make a design having adequate structural balance for the closed-loop frame, so that it is easy to satisfy requirements for performance balance of different parts. In conclusion, in one aspect, the two structures can uniformly distribute a collision force on the beams. In another aspect, the two structures can stop elements disposed in the front of the vehicle, thereby preventing a vehicle power apparatus such as a motor from moving backward due to collision impact to enter the occupant compartment or compress battery packs located below the floor panel 300 to trigger secondary damage.

Based on the foregoing technical solution, the present disclosure further provides a vehicle. The vehicle includes the vehicle body structure provided in the present disclosure. Therefore, the vehicle has all the advantages and beneficial effects of the vehicle body structure provided in the present disclosure. To reduce unnecessary repetition, details are not described herein again. Specifically, the vehicle may be an electric vehicle, so as to adapt the vehicle body structure to the mounting of battery packs.

Exemplary implementations of the present disclosure are described above in detail with reference to the accompanying drawings. However, the present disclosure is not limited to specific details of the foregoing implementations. In the scope of the technical concept of the present disclosure, various simple variations may be made to the technical solutions of the present disclosure. These simple variations all fall within the protection scope of the present disclosure.

In addition, it should be noted that the specific technical features described in the foregoing specific implementations may be combined in any appropriate manner if they are not contradictory. To reduce unnecessary repetition, various possible combinations are not described again in the present disclosure.

In addition, various different implementations of the present disclosure may be randomly combined. The combinations should also be considered as the content disclosed in the present disclosure provided that the combinations do not depart from the idea of the present disclosure.

What is claimed is:

1. A vehicle body structure, comprising:
   a front longitudinal beam (100), a front compartment crossbeam (220), and a dash panel (320),
   wherein the front longitudinal beam (100) comprises a left front longitudinal beam and a right front longitudinal beam that are disposed at an interval in a transverse direction, the front compartment crossbeam (220) is mounted on the left front longitudinal beam and the right front longitudinal beam, and is located in front of the dash panel (320), and a projection area of the front compartment crossbeam (220) on the dash panel (320) in an X direction at least partially covers a projection (PA) of a preset area (AA) surrounding a pedal center point (A) on the dash panel (320) in the X direction.

2. The vehicle body structure according to claim 1, wherein the preset area (AA) surrounding the pedal center point (A) comprises at least one of the pedal center point (A), a pedal left projection point (A1) 150 mm away from the pedal center point (A) in a transverse direction or a pedal right projection point (A2) 150 mm away from the pedal center point (A) in a transverse direction.

3. The vehicle body structure according to claim 1, wherein the preset area (AA) surrounding the pedal center point (A) comprises an area covering 150 mm from the pedal center point (A) as the center in a transverse direction.

4. The vehicle body structure according to claim 1, wherein the preset area (AA) surrounding the pedal center point (A) is at least one of a preset area surrounding a brake pedal center point (A), a preset area surrounding an accelerator pedal center point (A2) or a preset area surrounding a clutch pedal center point (A1).

5. The vehicle body structure according to claim 1, wherein the front compartment crossbeam (220) is connected to the dash panel (320).

6. The vehicle body structure according to claim 5, wherein the front compartment crossbeam is at least partially located right behind a vehicle power apparatus.

7. The vehicle body structure according to claim 5, wherein the dash panel (320) is formed with a steering column via (322), and the front compartment crossbeam (220) is disposed in tight contact with the steering column via (322).

8. The vehicle body structure according to claim 7, wherein the steering column via (322) is located above the front compartment crossbeam (220), so that a lower section of a steering column (323) that passes through the steering column via (322) is located in front of the front compartment crossbeam (220).

9. The vehicle body structure according to claim 1, wherein the front longitudinal beam (100) is provided with a first groove structure that extends in a longitudinal direction and has an upward opening, the first groove structure comprises a first longitudinal beam bottom wall (101) and a first longitudinal beam side wall (102), an upper edge at the opening of the first groove structure folds outward to form a first-longitudinal-beam-side-wall flange (102a), the front compartment crossbeam (220) is formed as a second groove structure with an upward opening, an end portion of the second groove structure is at least partially connected to the first longitudinal beam bottom wall (101) of the first groove structure, an edge at the opening of the second groove structure folds outward to form a first flange (220a) extending in the transverse direction, the first flange (220a) is joined to the first-longitudinal-beam-side-wall flange (102a), an end portion of the first flange (220a) folds outward to form a second flange (220b) extending in a vertical direction, the second flange (220b) is joined to the first longitudinal beam side wall (102), the end portion of the second groove structure is further formed with a third flange (220c) extending in the transverse direction, and the third flange (220c) is joined to the first longitudinal beam bottom wall (101).

10. The vehicle body structure according to claim 1, wherein the front longitudinal beam (100) is formed with, along a wheel envelope, an inward concave portion (105) for avoiding a wheel, the front compartment crossbeam (220) is disposed in the inward concave portion (105), and a reinforcing plate is connected to a position, corresponding to the inward concave portion (105), of the inner wall of the front longitudinal beam (100).

11. The vehicle body structure according to claim 1, further comprising a front crossbeam (210) disposed behind the front compartment crossbeam (220) at an interval, wherein a force transfer structure is connected between the front compartment crossbeam (220) and the front crossbeam (210).

12. The vehicle body structure according to claim 11, wherein the front crossbeam (210) is a vehicle body crossbeam fastened on a lower surface of a floor panel (300), the floor panel (300) is located behind the front compartment crossbeam (220), and a front end of the floor panel (300) is connected to the dash panel (320).

13. The vehicle body structure according to claim 11, wherein the front crossbeam (210) is a vehicle body crossbeam near a front compartment of a vehicle body, a vehicle body crossbeam mounted near the dash panel (320), a vehicle body crossbeam mounted near a front end of a sill inner plate, or a vehicle body crossbeam disposed in front of a front seat mounting crossbeam.

14. The vehicle body structure according to claim 11, wherein the front crossbeam (210) is a battery pack mounting front crossbeam.

15. A vehicle, comprising the vehicle body structure according to claim 1.

16. The vehicle body structure according to claim 2, wherein the preset area (AA) surrounding the pedal center point (A) comprises an area covering 150 mm from the pedal center point (A) as the center in a transverse direction.

17. The vehicle body structure according to claim 16, wherein the preset area (AA) surrounding the pedal center point (A) is at least one of a preset area surrounding a brake pedal center point (A), a preset area surrounding an accelerator pedal center point (A2) or a preset area surrounding a clutch pedal center point (A1).

\* \* \* \* \*